(12) United States Patent
Eto et al.

(10) Patent No.: US 12,715,140 B2
(45) Date of Patent: Aug. 25, 2026

(54) HANDLING SYSTEM, HANDLING METHOD, STORAGE MEDIUM, INFORMATION PROCESSING DEVICE, AND DATA STRUCTURE

(71) Applicant: Kabushiki Kaisha Toshiba, Tokyo (JP)

(72) Inventors: Haruna Eto, Kawasaki (JP); Akihito Ogawa, Fujisawa (JP); Seiji Tokura, Kawasaki (JP); Kazuma Komoda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 18/795,846

(22) Filed: Aug. 6, 2024

(65) Prior Publication Data

US 2024/0391110 A1 Nov. 28, 2024

Related U.S. Application Data

(63) Continuation of application No. PCT/JP2023/004192, filed on Feb. 8, 2023.

(30) Foreign Application Priority Data

Feb. 8, 2022 (JP) ................................ 2022-018123

(51) Int. Cl.
*B25J 9/16* (2006.01)
*B25J 15/08* (2006.01)

(52) U.S. Cl.
CPC .......... *B25J 9/1697* (2013.01); *B25J 9/1653* (2013.01); *B25J 15/08* (2013.01)

(58) Field of Classification Search
CPC ........ B25J 9/1697; B25J 9/1653; B25J 15/08; B25J 9/1612; B25J 13/00; B25J 13/08
See application file for complete search history.

(56) References Cited

U.S. PATENT DOCUMENTS

| | | | |
|---|---|---|---|
| 6,056,108 | A | 5/2000 | Buchi et al. |
| 9,889,564 | B2 | 2/2018 | Cronie |

(Continued)

FOREIGN PATENT DOCUMENTS

| | | |
|---|---|---|
| DE | 10 2021 115 592 A1 | 12/2021 |
| DE | 10 2020 100 568 B4 | 3/2022 |

(Continued)

OTHER PUBLICATIONS

International Search Report issued Apr. 18, 2023 in PCT/JP2023/004192 (with English Translation), 5 pages.

(Continued)

*Primary Examiner* — Adam R Mott
*Assistant Examiner* — Ricardo I Viscarra
(74) *Attorney, Agent, or Firm* — Oblon, McClelland, Maier & Neustadt, L.L.P.

(57) ABSTRACT

According to an embodiment, a handling system includes a holder and controller. The holder holds an object. The controller controls the holder. The controller acquires information about physical properties of the object. The controller generates a holding plan for holding the object by the holder on the basis of the physical properties. The holding plan includes information of a holding region of the object in which the object is held by the holder. The controller causes the holder to hold the object on the basis of the holding plan.

18 Claims, 16 Drawing Sheets

(56) References Cited

U.S. PATENT DOCUMENTS

| | | | | |
|---|---|---|---|---|
| 2007/0239315 | A1 | 10/2007 | Sato et al. | |
| 2009/0116728 | A1 | 5/2009 | Agrawal et al. | |
| 2011/0123122 | A1 | 5/2011 | Agrawal et al. | |
| 2013/0211593 | A1 | 8/2013 | Domae et al. | |
| 2018/0050451 | A1 | 2/2018 | Takanishi et al. | |
| 2018/0272535 | A1 | 9/2018 | Ogawa et al. | |
| 2018/0339867 | A1 | 11/2018 | Hasegawa et al. | |
| 2019/0143507 | A1 | 5/2019 | Nishina et al. | |
| 2020/0030976 | A1 | 1/2020 | Diankov | |
| 2020/0316774 | A1* | 10/2020 | Rodrigues | B25J 9/1664 |
| 2021/0094187 | A1* | 4/2021 | Kanemoto | B25J 13/085 |
| 2021/0260755 | A1* | 8/2021 | Kuratani | B25J 9/1664 |
| 2021/0291366 | A1* | 9/2021 | Eto | B25J 9/1664 |
| 2022/0203547 | A1* | 6/2022 | Majumdar | G06T 7/73 |
| 2022/0324103 | A1 | 10/2022 | Yamamoto | |
| 2023/0042756 | A1* | 2/2023 | Song | G06V 10/25 |
| 2023/0071488 | A1* | 3/2023 | Kanemoto | B25J 9/1697 |
| 2023/0286140 | A1* | 9/2023 | Usui | B25J 19/023 |
| 2024/0269845 | A1* | 8/2024 | Doi | B25J 19/023 |

FOREIGN PATENT DOCUMENTS

| | | | |
|---|---|---|---|
| DE | 11 2021 005 493 | T5 | 8/2023 |
| EP | 3 711 907 | A1 | 9/2020 |
| EP | 4 049 809 | A1 | 8/2022 |
| JP | 62-80783 | A | 4/1987 |
| JP | 63-52268 | A | 3/1988 |
| JP | 4-146090 | A | 5/1992 |
| JP | 10-6266 | A | 1/1998 |
| JP | 11-180538 | A | 7/1999 |
| JP | 2003-136465 | A | 5/2003 |
| JP | 2009-115783 | A | 5/2009 |
| JP | 2010-256276 | A | 11/2010 |
| JP | 2011-93014 | A | 5/2011 |
| JP | 2011-93015 | A | 5/2011 |
| JP | 2011-129094 | A | 6/2011 |
| JP | 5322206 | B2 | 10/2013 |
| JP | 5558585 | B2 | 7/2014 |
| JP | 2017-107432 | A | 6/2017 |
| JP | 2018-27581 | A | 2/2018 |
| JP | 6325174 | B1 | 5/2018 |
| JP | 6360747 | B2 | 7/2018 |
| JP | 2018-158391 | A | 10/2018 |
| JP | 2019-89157 | A | 6/2019 |
| JP | 2020-11317 | A | 1/2020 |
| JP | 2020-151780 | A | 9/2020 |
| JP | 6757328 | B2 | 9/2020 |
| JP | 2021-39457 | A | 3/2021 |
| JP | 2021-45815 | A | 3/2021 |
| WO | WO 2006/006624 | A1 | 1/2006 |
| WO | WO 2020/008538 | A1 | 1/2020 |

OTHER PUBLICATIONS

Hanai, R. "Approaches towars Difficult Problems in Robot Picking: Visuotactile Sensing and Flexible Object Recognition", Image Laboratory, vol. 32, No. 12, Dec. 2021, pp. 48-53 (total 12 pages) (with unedited computer-generated English Translation).

Yamamoto, M. "Optimum Bin Picking Problem for Flexible Pouched Objects Using Adhesion Robotic Hand", Proceedings of the 34thv Annual Conference of the Robotics Society of Japan, Sep. 7, 2016, 6 pages (with unedited computer-generated English Translation).

German Office Action-issued:Sep. 8, 2025 in German Patent Application No. 11 2023 000 857.4 (with English Translation), 11 pages.

* cited by examiner 1
140 (100)
26
O
144
146
142
134
132
130
134
14(10)
132
134
22
V2
O
40
30
12(10)
14
112
114
110
112
114
20
V1
O
122
124
24
124
120 (100)

FIG. 11C

HANDLING SYSTEM, HANDLING METHOD, STORAGE MEDIUM, INFORMATION PROCESSING DEVICE, AND DATA STRUCTURE

CROSS-REFERENCE TO RELATED APPLICATION

Priority is claimed on Japanese Patent Application No. 2022-018123, filed Feb. 8, 2022, the content of which is incorporated herein by reference.

FIELD

Embodiments of the present invention relate to a handling system, a handling method, a storage medium, an information processing device, and a data structure.

BACKGROUND

A handling device for performing a picking operation is known.

BRIEF DESCRIPTION OF THE DRAWINGS

FIG. 11C is a schematic diagram showing an example of the calculation process of the handling system according to the embodiment.

DETAILED DESCRIPTION

Figure 1:
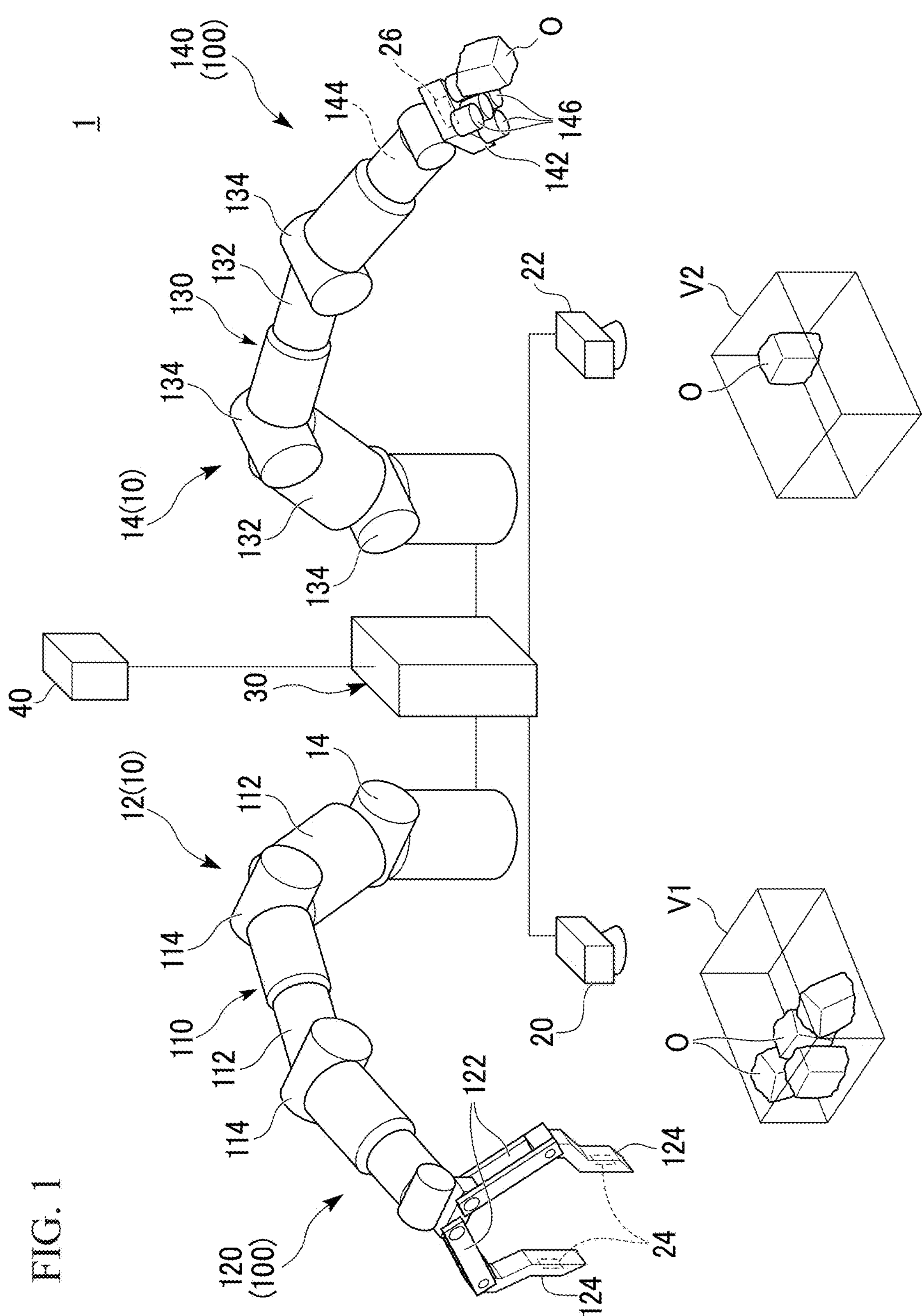
FIG. 1 is a schematic diagram showing a configuration of a handling system according to an embodiment.

According to an embodiment, a handling system includes a holder and controller. The holder holds an object. The controller controls the holder. The controller acquires information about physical properties of the object. The controller generates a holding plan for holding the object by the holder on the basis of the physical properties. The holding plan includes information of a holding region of the object in which the object is held by the holder. The controller causes the holder to hold the object on the basis of the holding plan.

Hereinafter, a handling system, a handling method, a storage medium, an information processing device, and a data structure according to embodiments will be described with reference to the drawings. The drawings are schematically or conceptually shown and a relationship between a thickness and a width of each part, a size ratio between parts, and the like are not necessarily identical to those in reality. Moreover, even if the same parts are shown, dimensions or ratios may be differently shown according to the drawing. Moreover, XYZ coordinates shown in the drawings are defined for convenience of description and the present invention is not limited thereto.

In the present specification, the term "based on XX" means "based on at least XX" and also includes a case based on another element in addition to XX. Moreover, the term "based on XX" is not limited to a case where XX is directly used and includes a case based on a result of performing a calculation operation or processing on XX. "XX" is any element (e.g., any information).

A handling system 1 according to an embodiment will be described with reference to FIGS. 1 and 2.

FIG. 1 is a schematic diagram showing a configuration of the handling system 1 according to the embodiment.

Figure 2:
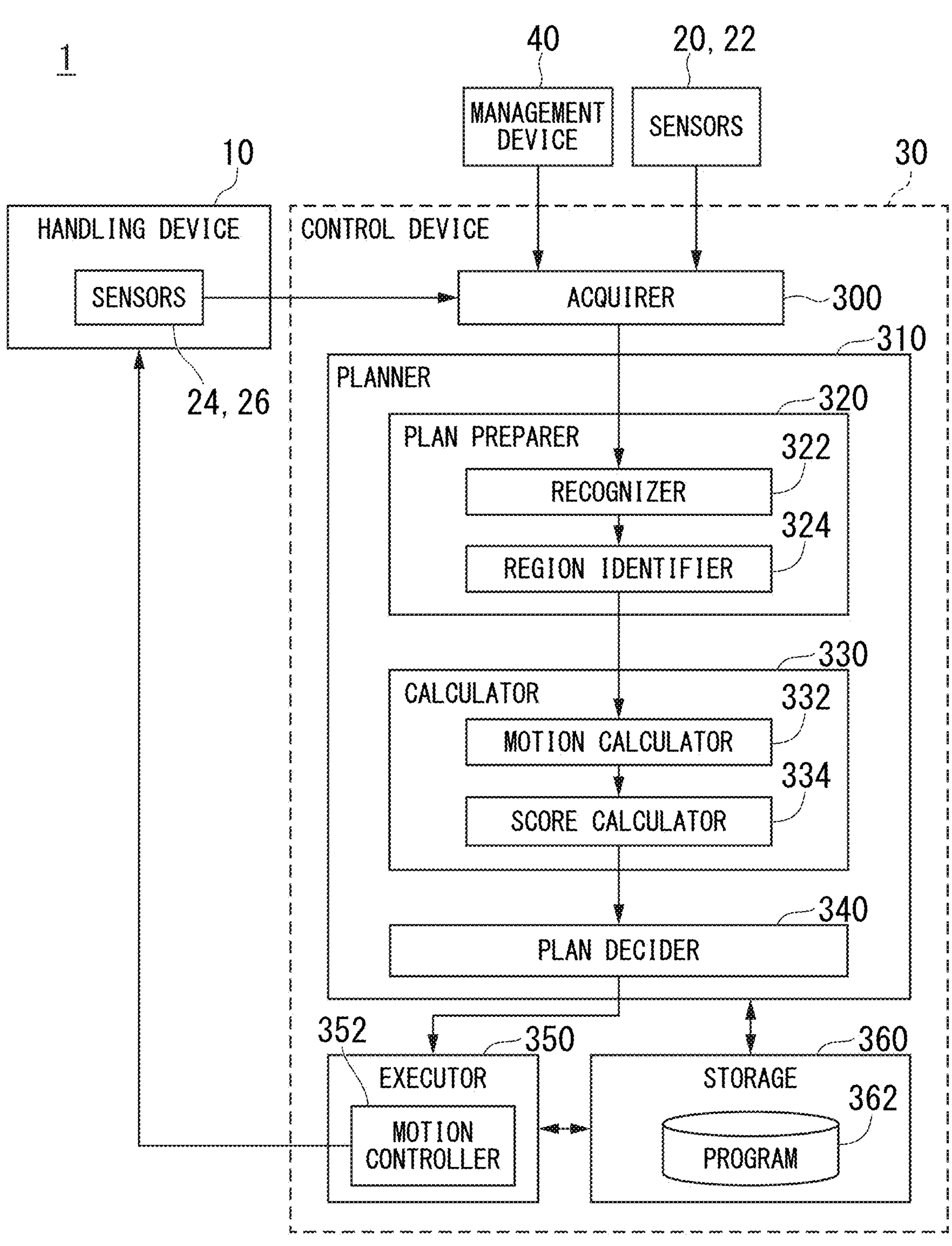
FIG. 2 is a block diagram showing the configuration of the handling system according to the embodiment.

FIG. 2 is a block diagram showing the configuration of the handling system 1 according to the embodiment.

As shown in FIG. 1, the handling system 1 is a system for handling one or more objects. The handling system 1 is, for example, a transport system for logistics and a picking system. For example, the handling system 1 moves an object (a physical object) O positioned in a movement source V1 to a movement destination V2. For example, the handling system 1 extracts a designated number of objects from one or more types of objects O stored in the movement source V1 or the like and performs an operation for loading the objects to the movement destination V2.

The movement source V1 is, for example, any of various types of conveyors, various types of pallets, a container such as a tote bag or a collapsible container, or the like. The "container" broadly refers to a member capable of accommodating an object O (e.g., a box-shaped member). However, the movement source V1 is not limited to the example described above. In the following description, the "movement source V1" may be referred to as an "extraction source container V1."

One or more objects O are randomly placed in the movement source V1. The movement source V1 may store one or more objects O of the same type or may store one or more of objects O of each of two or more types. For example, the movement source V1 stores a plurality of objects O of the same type. For example, the object O to be held has an irregular shape on at least a part of a surface thereof. In the present embodiment, there are various types of outer shapes of objects O from a small object of a 5 cm square or the like to a large object of a 30 cm square or the like. Also, there are various types of objects O from a light object of several tens of grams (g) or the like to a heavy object of several kilograms (kg) or the like. However, the size and the weight of the object O are not limited to the examples described above.

The movement destination V2 is, for example, a container such as a tote bag or a collapsible container. However, the movement destination V2 is not limited to the above-described examples. For example, the handling system 1 may move the object O to the movement destination V2 other than the container. In the following description, the "movement destination V2" may be referred to as a "transport destination container V2" and the "movement source V1" and the "movement destination V2" may be simply collectively referred to as "containers."

The handling system 1 is not limited to a handling system for logistics. The handling system 1 can be widely applied to industrial robot systems or other systems. The "handling system," and "handling device" mentioned in the present specification are not limited to systems and devices whose main purpose is to transport objects and include systems and devices that transport (move) objects as a part of product assembly or for another purpose.

As shown in FIG. 1, the handling system 1 includes a handling device 10, various types of sensors 20, 22, 24, and 26, a control device 30 (an example of a "controller"), and a management device 40. In addition, the "handling system" in the present specification is not limited to a handling system including two or more devices, and may include a single handling device (e.g., a handling device in which a sensor and a control device are incorporated). That is, the single handling device is also called a "handling system" in the present specification.

The handling device 10 is, for example, a robot device. The handling device 10 grasps the object O positioned in the extraction source container V1 and moves the held object O to the transport destination container V2. The handling device 10 can communicate with the control device 30 by wire or wirelessly. In the present embodiment, the handling device 10 has a first handling device 12 and a second handling device 14.

The first handling device 12 includes, for example, a first movable arm 110 and a pincher 120 (an example of a "holder") provided at the tip of the first movable arm 110.

The first movable arm 110 is a moving mechanism that moves the pincher 120 to a desired position. For example, the first movable arm 110 is a six-axis vertical polyarticular robot arm. The first movable arm 110 can take various positions and postures. Like human arms or hands, the first movable arm 110 can take a wider variety of postures to grasp an object. The first movable arm 110 includes, for example, a plurality of arm members 112 and a plurality of rotators 114 in which a plurality of arm members 112 are rotatably connected.

A configuration of the first movable arm 110 is not particularly limited and may be a three-axis Cartesian robot arm. The first movable arm 110 may be a mechanism for moving the pincher 120 to a desired position using other components. For example, the first movable arm 110 may be a flying object (e.g., a drone) that lifts and moves the pincher 120 using a rotary wing or the like.

The pincher 120 is a holding mechanism (end effector) for holding the object O positioned in the extraction source container V1. The pincher 120 has a pinching hand 122.

The pinching hand 122 has two or more pinching claws 124 for holding the object O. For example, the pinching hand 122 is a gripper type hand configured to grasp the object O by holding the object O with two fingers thereof. The pinching hand 122 can be provided at the tip of the first movable arm 110. A configuration of the pinching hand 122 is not limited to this and may be, for example, a gripper type hand configured to hold the object O by grasping the object O with three fingers or four fingers thereof.

In addition, the pincher 120 may be a hybrid type hand further having an adsorption device and an adsorption pad communicating with the adsorption device. In this case, the pincher 120 can grasp the object O according to pinching and/or adsorption. The adsorption pad can be provided at a finger tip of the pinching hand 122. A plurality of adsorbers may be provided at the finger tip of the pinching hand 122. Alternatively, a hybrid type hand having a pinching hand and an adsorption hand facing different directions (e.g., opposite directions) may be used. In addition, the configuration of the pincher 120 is not particularly limited.

The second handling device 14 has, for example, a second movable arm 130 and an adsorber 140 (an example of the "holder") provided at the tip of the second movable arm 130. A second movable arm 130 of the second handling device 14 has an arm member 132 and a rotator 134 like the first movable arm 110 of the first handling device 12.

The adsorber 140 is a holding mechanism (end effector) configured to hold the object O positioned in the extraction source container V1. For example, the adsorber 140 has an adsorption hand 142 configured to hold the object O according to adsorption. The adsorption hand 142 has an adsorption device 144 and an adsorption pad 146 communicating with the adsorption device 144.

The adsorption device 144 is, for example, a vacuum pump. The adsorption device 144 communicates with each of a plurality of adsorption pads 146 via a hose or the like. The adsorption device 144 is driven to lower the pressure within each adsorption pad 146 below atmospheric pressure. Thereby, the object O is adsorbed and held by the adsorption pad 146.

The adsorption pad 146 is provided on a tip of the adsorption hand 142. For example, a plurality of adsorption pads 146 are provided on the tip of adsorption hand 142. At least one of the adsorption pads 146 has an outer shape smaller than the smallest object O positioned in the extraction source container V1. The second handling device 14 adsorbs and holds the object O using only one or more adsorption pads 146 selected from the plurality of adsorption pads 146.

In the following description, the "pincher 120" and the "adsorber 140" are collectively referred to as the "holder 100." That is, it is assumed that the "holder 100" includes the "pincher 120" and the "adsorber 140." Here, the handling device 10 including the pincher 120 and the adsorber 140 has been described as an example. However, the configuration of the holder 100 is not limited to a configuration including one pinching hand 122 and one adsorption hand 142 as described above. For example, the holder 100 may include two or more pinching hands or may include two or more adsorption hands. In this case, the holder 100 may be configured to have a plurality of pinching-type hands that are different in at least any one of properties such as, for example, a configuration, a structure, a shape, a size, and an arrangement. Specifically, for example, the holder 100 may include two or more pinching hands having claws of different lengths and opening widths. Alternatively, the holder 100 may be configured to have a plurality of adsorption hands which are different in at least any one of the properties such as, for example, a configuration, a structure, a shape, a size, and an arrangement. Specifically, for example, the holder 100 may include two or more adsorption hands having different adsorption pad arrangements, adsorption pad diameters, bellows structures, and the like. Even in such cases, it is possible to execute a handling motion similar to that of the above-described embodiment and obtain equivalent effects.

The handling device 10 may have a mechanism for holding the object O in a holding method other than pinching and adsorption, in addition to the pincher 120 and the adsorber 140 or in place of the pincher 120 and/or the adsorber 140. For example, the handling device 10 may be a holder capable of holding the object O with a magnetic force. Alternatively, the handling device 10 may have a holder (e.g., a jamming gripper) including a flexible membrane filled with powder and a vacuum pump that extracts air from the flexible membrane and configured to hold the object O using a jamming phenomenon.

Various types of sensors 20, 22, 24, and 26 detect the state of the object O and the state of the holder 100. The sensors 20 to 26 are connected to the control device 30 by wire or wirelessly and transmit detection results to the control device 30. In addition, the sensors 20 to 26 may not necessarily be separate sensors, and a specific sensor may independently perform the functions of two or more sensors among the sensors 20 to 26.

The movement source sensor 20 is a light intensity sensor such as a camera or any one of various types of sensors arranged near the extraction source container V1 (e.g., directly above or diagonally above the extraction source container V1). The movement source sensor 20 acquires, for example, information about the object O positioned in the movement source V1 and information about the movement source V1. The information acquired by the movement source sensor 20 is, for example, "image data," "distance image data," "shape data," and the like. The "distance image data" is image data having distance information in one or more directions (e.g., depth information from any reference plane set above the movement source V1). The "shape data" is information indicating an outer shape of the object O and the like. The information detected by the movement source sensor 20 is output to the control device 30. Also, the movement source sensor 20 may be provided as a part of the handling device 10.

The movement destination sensor 22 is a camera or any one of various types of sensors arranged near the transport destination container V2 (e.g., directly above or diagonally above the transport destination container V2). The movement destination sensor 22 detects, for example, information about the shape of the movement destination container V2 (including shapes of the inner wall surface and the partition) and information about an object O previously placed in the movement destination container V2. The information acquired by the movement destination sensor 22 is, for example, "image data," "distance image data," "shape data," and the like. The information detected by the movement destination sensor 22 is output to the control device 30. In addition, the movement destination sensor 22 may be provided as a part of the handling device 10.

The pincher-specific sensor 24 is any of various types of sensors provided on the pincher 120 (e.g., inside of a pinching claw 124) or near the pincher 120. The pincher-specific sensor 24 acquires information about physical states of the pincher 120 such as a distortion or a surface state of the pinching claw 124 and a pressure applied to the pinching claw 124. The pincher-specific sensor 24 includes, for example, one or more physical sensors such as a distortion sensor, a pressure sensor, and a proximity-contact sensor. The pincher-specific sensor 24 may further acquire physical information of the object O. The pincher-specific sensor 24 may be provided as a part of the handling device 10.

The adsorber-specific sensor 26 is a sensor provided in the adsorber 140 (e.g., inside of the adsorption hand 142) or near the adsorber 140. The adsorber-specific sensor 26 acquires, for example, information about physical states of the adsorber 140 such as an internal pressure of the adsorption pad 146, a surface state applied to the adsorption pad 146, and an operation state of the adsorption device 144. The adsorber-specific sensor 26 includes, for example, one or more physical sensors such as a distortion sensor, a pressure sensor, and a proximity-contact sensor. The adsorber-specific sensor 26 may further acquire the physical information of the object O. Also, the adsorber-specific sensor 26 may be provided as a part of the handling device 10.

The control device 30 manages and controls the overall handling system 1. For example, the control device 30 acquires the information detected by the sensors 20 to 26 and controls the handling device 10 on the basis of the acquired information. The control device 30 is, for example, an information processing device (a computer) that can execute a program (a computer) and includes a processor, a memory, a storage, and the like. The control device 30 is connected to the handling device 10 and the sensors 20 to 26 by wire or wirelessly.

As shown in FIG. 2, the control device 30 includes an acquirer 300, a planner 310, an executor 350, and a storage 360 as its functional portions.

The acquirer 300 receives an input operation from a user and an input signal from the management device 40 and acquires order information including a list of objects O for picking manipulations and information about the physical properties of the objects O. Moreover, the acquirer 300 acquires information including detection results from the movement source sensor 20, the movement destination sensor 22, the pincher-specific sensor 24, and the adsorber-specific sensor 26.

The physical properties of the object O are properties that are observable or measurable without changing the chemical composition of the object O. Examples of physical properties include mechanical properties (dynamical properties), optical properties, electrical properties, and magnetic properties. Examples of mechanical properties include hardness, softness (flexibility), rigidity (resistance to deformation), deformability, strength, elasticity, malleability, ductility, and toughness. The handling system 1 selects an appropriate processing method in accordance with the physical property of the object O in a case in which the handling device 10 plans or executes the control content of an motion for holding the object O. For example, the handling system 1 changes an image recognition method for the object O, a grasping region identification method, a grasping motion calculation method, and the like in accordance with the mechanical properties of the object O. Moreover, the handling system 1 also changes the image recognition method for the object O, the grasping region identification method, and the like in accordance with the optical properties of the object O. Moreover, the handling system 1 may change a method of selecting the holding method to be used and the like in accordance with the electrical properties and the magnetic properties of the object O (e.g., in a case in which the holder having magnetic properties is used and the like).

Information about the physical properties of the object O acquired by the acquirer 300 may be generated by any method. For example, the order information may include physical properties of the object O to be picked up together with a type thereof. In this case, when the user who inputs the order information inputs the type of the object O of an order target, the physical property may also be input. Alternatively, the physical properties of the actual object O stored in the extraction source container V1 may be inspected by a user on site or measured by any measurement device. This measurement device may be configured to automatically measure physical properties of the object O and register the physical properties in a database in combination with a transport mechanism such as a belt conveyor for transporting the object O. Alternatively, the handling system 1 may automatically generate order information including information about physical properties on the basis of the type of the object O input as the order target and association information which associates recognition information of the object O with the physical properties thereof (e.g., an article database, a processing history of the handling system 1, and a learned model which has learned such relationships). For example, the handling system 1 may use a data structure including recognition information of each object O and information about the physical properties of each object O to identify the object O to be held with a plurality of objects O and acquire information about the physical properties corresponding to the object O. The handling system 1 may search for an article having a certain degree of similarity to estimate the physical properties of the object O even for the object O not registered in this association information. For example, in a case in which the object O to be held is not included in the above-described data structure, the handling system 1 can identify an object O having a certain degree of similarity to the object O to be held from among a plurality of objects O included in the data structure and acquire information about the physical properties of the identified object O from the data structure. The handling system 1 can grasp and transport the object O on the basis of an estimation result and can update the data structure such as the association information in accordance with a holding/transport result. Alternatively, the handling system 1 may estimate the physical properties each time from image data obtained by photographing the object O, patten information of the extracted texture (i.e., forms of a physical object that can be recognized from the image data, such as the texture, appearance, shape, structure, or surface state), and the like.

The planner 310 generates a holding plan, or grasping plan, for holding the object O by the holder 100 on the basis of the information acquired by the acquirer 300. The planner 310 can change and decide a method of generating the holding plan in accordance with the physical properties of the object O. Specifically, the planner 310 includes a plan preparer 320, a calculator 330, and a plan decider 340. In addition, the planner 310 may be mounted as a single planning device (an example of an "information processing device") or a planning system (an information processing system).

The plan preparer 320 processes the information acquired by the acquirer 300 before calculations for a specific holding plan are performed. Specifically, the plan preparer 320 includes a recognizer 322 and a region identifier 324.

The recognizer 322 performs image recognition for the image data. For example, the recognizer 322 performs the image recognition by receiving the image data of the extraction source container V1 and the transport destination container V2 acquired by the movement source sensor 20 and the movement destination sensor 22. Specifically, the recognizer 322 can use any image recognition technology to identify the position, orientation, shape, type, and the like of the object O in the image from the image data of the extraction source container V1 and the transport destination container V2 where the object O is stored.

For example, the recognizer 322 can recognize the position of the object O in the image by detecting the contour of the object O in the image. In a case in which the plurality of objects O are included in the image, the recognizer 322 can divide the image into a plurality of segments for each object O so that one object O is included in each segment.

The recognizer 322 can perform a filtering process for the image data. For example, the recognizer 322 can use a noise removal filter, a contour extraction filter, a smoothing filter, or the like to delete unnecessary components or information in the image and extract a characteristic portion (e.g., a contour of the object O). Specifically, the recognizer 322 can apply a low-pass filter, a Gaussian filter, a moving average filter, a median filter, a bilateral filter, and the like to the image data.

The recognizer 322 can change a type and/or parameter of the filter to be applied according to a situation. For example, in a case in which noise to be removed from the image is large, the recognizer 322 can lower a standard of noise detection (i.e., more parts in the image are regarded as noise by mitigating the condition of noise) by increasing the strength of the filter. For example, the recognizer 322 can decide on a degree to which irregularities on the surface of the object O appearing in the image are ignored as noise by appropriately selecting a type and/or a parameter of the filter.

The recognizer 322 can estimate the surface shape of the object O in the image. In particular, in a case in which the acquirer 300 has acquired distance image data including information in the depth direction, the recognizer 322 can easily estimate a three-dimensional shape including the surface shape of the object O from the distance image data.

The recognizer 322 can detect a flat region on the surface of the object O. The recognizer 322 can detect a region where the object O can be adsorbed in a plane detection process, particularly in a case in which the adsorber 140 performs adsorption and holding processes. In a case in which the surface of the object O has a deep recess or hole, air leakage occurs even if a region of the adsorber 140 is adsorbed and the adsorber 140 cannot perform the adsorption process. Therefore, in this case, it is effective to detect a planar region not including such a recess or hole.

For example, the recognizer 322 can set a reference plane along the surface of the object O and appropriately set a plane detection threshold value in a plane detection process. The recognizer 322 can consider the specific portion as a plane in a case in which a distance between the reference plane and the irregularity in the specific portion on the surface of the object O is less than the plane detection threshold value (e.g., 5 mm). For example, in a case in which the plane detection threshold value is set to a relatively large value, a portion considered to be a plane on the surface of the object O by the recognizer 322 becomes relatively large.

On the other hand, in a case in which the plane detection threshold value is set to a relatively small value, a portion considered to be a plane on the surface of the object O by the recognizer 322 becomes relatively small.

The region identifier 324 identifies a holding region, or grasping region, of the object O estimated to be able to be held by the holder 100 on the basis of an image recognition result of the recognizer 322. For example, the region identifier 324 can identify a plurality of candidate regions as candidates for a holding region in the holder 100 (i.e., the pincher 120 or the adsorber 140) to grasp the object O.

For example, in a case in which the object O is held by the pincher 120, the region identifier 324 searches for a position where the pincher 120 can insert the pinching claw 124 on the basis of shape information of the object O recognized by the recognizer 322 and the like. For example, the region identifier 324 may perform a matching calculation process between the tip shape of the pinching claw 124 and the shape of the object O or may select a position near the contour of the object O as an insertion position of the pinching claw 124. Thereby, the region identifier 324 is able to identify one or more holding regions where the pincher 120 can pinch the object O in the image as candidate regions.

For example, in a case in which the object O is held by the adsorber 140, the region identifier 324 searches for a surface region of the object O, to which the adsorber 140 can adsorb, on the basis of shape information of the object O recognized by the recognizer 322 and the like (in particular, a result of the plane detection process). Thereby, the region identifier 324 can identify one or more flat holding regions where the adsorber 140 can adsorb and hold the object O in the image as candidate regions. For example, the region identifier 324 executes a matching calculation process with the adsorption shape of the adsorption hand 142 with respect to a planar region detected by the recognizer 322. In addition, the adsorption hand 142 can take various adsorption shapes by controlling solenoid valves provided on the respective adsorption pads 146 and the region identifier 324 can execute a matching calculation process with respect to each of the adsorption shapes that can be implemented by the adsorption hand 142.

The calculator 330 performs a calculation process of generating a specific holding plan on the basis of various types of information processed by the plan preparer 320. For example, the calculator 330 individually performs a calculation process for each candidate region identified by the region identifier 324. Hereinafter, the holding plan calculated for each candidate region is referred to as a "candidate plan." Generally, it is preferable for the holder 100 to grasp the object O near the center of gravity thereof so that the object O, which is rigid, is stably held and transported. However, for example, in an environment where objects O are randomly stacked, the holder 100 cannot necessarily grasp the vicinity of the center of gravity thereof and the holder 100 can grasp the objects O in various postures around the center of gravity thereof. Therefore, the calculator 330 can generate a plurality of holding plan candidates (candidate plans) and then evaluate holding stability for each candidate plan. In a process of evaluating the holding stability, the calculator 330 can take into account not only a positional relationship between the holding region and the center of gravity but also a contact state between the holder 100 and the object O, a stress force generated in the holder 100, and the like. Thereby, a holding plan for holding a region near the center of gravity and a holding plan having another high evaluation value can be generated. Specifically, the calculator 330 includes a motion calculator 332 and a score calculator 334.

The motion calculator 332 executes a calculation process required for a motion for the holder 100 to grasp the object O in the candidate region with respect to the candidate region identified by the region identifier 324. More specifically, the motion calculator 332 can calculate a target position of the holder 100 for holding the object O in the candidate region (i.e., a position of the movement destination of the holder 100), a posture at which the holder 100 grasps the object O in the candidate region, a route along which the holder 100 approaches the candidate region, an amount of opening and/or an amount of insertion of the pinching claw 124 when the pincher 120 grasps the object O, the number and/or arrangement of adsorption pads 146 used when the adsorber 140 grasps the object O, and the like. The motion calculator 332 can store a candidate region and a calculation result corresponding thereto in the storage 360 as a candidate plan. At this time, the motion calculator 332 can appropriately convert the candidate region into a format suitable for controlling the grasping motion. In this way, the motion calculator 332 can perform a motion calculation process of the holder 100 for each candidate region and generate a candidate plan corresponding to each candidate region.

In a process of calculating each candidate plan, the motion calculator 332 may perform a simplified calculation process in which the calculation required for the control of the handling device 10 is partially omitted and/or simplified.

The score calculator 334 calculates a score for each candidate plan calculated by the motion calculator 332. The calculated score is an evaluation point for each candidate plan and is an index defined in consideration of, for example, the ease of holding or transporting the object O in the holder 100 and the like.

For example, in a case in which the object O is held by the pincher 120, the score calculator 334 can calculate a score Sa of a candidate plan in which the pincher 120 grasps the object O in the candidate region, for example, as a linear or nonlinear combination of the following items (a) to (i).

(a) A score component a1 related to a distance between a contact point between the pinching claw 124 and the object O and a center-of-gravity position of the object O (b) A score component a2 related to a contact area between the pinching claw 124 and the object O (c) A score component a3 related to a contact surface property such as a cross-sectional quadratic moment (d) A score component a4 related to the mass of the object O.

(e) A score component a5 related to the reliability of recognition information (f) A score component a6 related to the presence or absence of physical interference between the handling device 10 and the environment (g) A score component a7 related to a local spatial margin around the tip of the pinching claw 124

(h) A score component a8 related to a degree of irregularity matching at a contact location between the pinching claw 124 and the object O (i) A score component a9 related to a degree of matching (angle difference) between a pinching direction of the pinching hand 122 and a short-axis direction of the object O viewed from the pinching hand 122 in a case in which the object O has an elongated shape having a long axis and a short axis The items (a) to (d) are components related to the ease of holding the object O in the pincher 120. The item (a) is a component set so that the score increases as the distance between the contact point and the center of gravity of the object O decreases, under the assumption that the grasping motion is stabilized as the distance between the contact point and the center of gravity of the object O decreases. The item (b) is a component related to holding stability caused by a contact area between the pinching claw 124 and the object O. The item (c) is a component related to the holding stability caused by the mechanical properties of the contact surface. The item (d) is a component related to the holding stability caused by the mass of the object O. The item (e) is a component related to the reliability of image recognition such as small noise in the vicinity of the candidate region in the image data. The item (f) is a component related to physical interference between a movement route of the pincher 120 calculated by the motion calculator 332 and the extraction source container V1, another object O, and the like. The item (g) is a component related to the size of a space into which the pinching claw 124 is inserted in the candidate region. The item (h) is a component related to an arrangement relationship such as the parallelism between the pinching claw 124 and the object O in the vicinity of the contact point therebetween. The item (i) is a component related to the priority that, in a case in which the pinching hand 122 pinches the elongated object O, especially in a case in which the pinching hand 122 pinches the object O from vertically just above using a two-parallel-finger hand, it is desirable for the pincher 120 to approach the object O in a position/posture relationship in which the pinching direction and the short axis direction of the object O intersect as viewed from the pinching hand 122 (e.g., in a case in which the long axis direction of the elongated object O and the pinching direction of the two pinching claws 124 are perpendicular to each other) in comparison with a position/posture relationship in which the pinching direction and the short axis direction of the object O intersect (e.g., in a case in which the elongated object O is arranged diagonally between the two pinching claws 124). Thus, the score Sa of the candidate plan can include a component related to the original image data, a component related to the pincher 120 itself, a component related to the object O itself, a component related to the candidate region including the contact point, a component related to a relative arrangement between the pincher 120 and the object O, a component related to an approach motion of the pincher 120, and the like.

For example, the score calculator 334 can calculate the score Sa using the following numerical equation. Here, p1 to p9 denote weights of components a1 to a9, respectively.

$$Sa = p1a1 + p2a2 + p3a3 + p4a4 + p5a5 + p6a6 + p7a7 + p8a8 + a9p9 \quad \text{[Calculation equation]}$$

Moreover, in a case in which the object O is held by the adsorber 140, the score calculator 334 can calculate a score Sb of a candidate plan in which the adsorber 140 grasps the object O in the candidate region, for example, as a linear or non-linear combination of the following items (a) to (g).

(a) A score component b1 related to a distance between a contact point between the adsorption pad 146 and the object O and a center-of-gravity position of the object O (b) A score component b2 related to a contact area between the adsorption pad 146 and the object O (c) A score component b3 related to a contact surface property such as cross-sectional quadratic moment (d) A score component b4 related to the mass of the object O (e) A score component b5 related to the reliability of recognition information (f) A score component b6 related to the presence or absence of physical interference between the handling device 10 and the environment (g) A score component b7 related to an amount of protrusion of the adsorption hand 142 viewed from the object O The items (a) to (f) are basically similar to the items (a) to (f) of the score Sa for the pincher 120. The item (g) is, for example, a component related to an amount of protrusion of the outer shape of the adsorption hand 142 protruding from the outer shape of the object O in a top view. The item (g) can be set so that the score increases as the amount of protrusion decreases under the assumption that it is more difficult to spatially pack and place the object O within the transport destination container V2 as the amount of protrusion increases. Thus, the score Sb of the candidate plan can include a component related to the original image data, a component related to the adsorber 140 itself, a component related to the object O itself, a component related to the candidate region including the contact point, a component related to a relative arrangement between the adsorber 140 and the object O, a component related to an approach motion of the adsorber 140, and the like.

For example, the score calculator 334 can calculate the score Sa using the following equation. Here, q1 to q7 denote weights of components b1 to b7, respectively.

$$Sb = q1b1 + q2b2 + q3b3 + q4b4 + q5b5 + q6b6 + q7b7 \quad \text{[Calculation equation]}$$

The score calculator 334 can change the calculation equations of the scores Sa and Sb or the weights p1 to p9 and q1 to q7 in the equations as necessary in accordance with the type or physical properties of the object O. Alternatively, the score calculator 334 may use a calculation equation that also takes into account the type and physical properties of the object O as described above.

The plan decider 340 decides on a holding plan to be executed by the handling device 10 by selecting a holding plan to be actually executed from the plan candidates calculated by the calculator 330. Specifically, the plan decider 340 selects a holding region for executing a grasping motion by comparing the scores calculated for each candidate region by the score calculator 334. For example, the plan decider 340 selects the candidate region having the highest score as a holding region.

The plan decider 340 can perform a more detailed calculation process with respect to the grasping motion of the holder 100 on the selected holding region. For example, first, the calculator 330 may execute only a minimum simplified calculation process required for a score calculation process for each candidate region and the plan decider 340 may execute a precise motion control calculation process having a high calculation load only for the holding region selected in a score comparison process. Thereby, the overall calculation load can be reduced.

In this way, the plan decider 340 selects a holding region to be actually executed from among the candidate regions and generates a holding plan including control content for holding the selected holding region.

In addition, the plan decider 340 may also function as a determiner configured to perform various types of determination. For example, the plan decider 340 can appropriately perform a rejection process by determining that a grasping motion is not valid with respect to a candidate region requiring a posture impossible for the handling device 10, a candidate region requiring an opening width exceeding a maximum opening width of the pinching hand 122, a candidate region where the pinching claw 124 cannot be sufficiently inserted, a candidate region where a sufficient number of adsorption pads 146 or an adsorption pressure cannot be secured for the mass of the object O, and the like.

The executor 350 instructs the handling device 10 to grasp the object O on the basis of the holding plan generated by the planner 310, thereby executing the grasping motion of the object O. Specifically, the executor 350 includes an motion controller 352. The motion controller 352 controls motions of the first movable arm 110 and the pincher 120 of the first handling device 12 and the second movable arm 130 and the adsorber 140 of the second handling device 14 on the basis of the holding plan. Specifically, the motion controller 352 issues instructions to the first handling device 12 and the second handling device 14 and causes the pincher 120 and/or the adsorber 140 to perform a grasping motion for the holding region of the object O in the extraction source container V1, a transport motion from the extraction source container V1 to the transport destination container V2, and a release motion for the object O in the transport destination container V2.

The storage 360 stores a program 362 for the control device 30 and various types of data for controlling the motion of the handling device 10. Specifically, in addition to a program, the storage 360 stores device data including a type, properties, and the like of the holder 100 of the handling device 10, order data including order information received from the user or the management device 40, object data including the type, physical information, shape, and the like of the object O, image data acquired by the movement source sensor 20 and the movement destination sensor 22, holder-specific state data acquired by the pincher-specific sensor 24 and the adsorber-specific sensor 26, plan data including a holding plan generated by the planner 310, an individual candidate region, a plan of a grasping motion corresponding to the candidate region (a candidate plan), a score of each candidate plan, and the like, history data including a control history and the like of the handling device 10, and the like.

The management device 40 manages an operation situation of the handling device 10, order information, an inventory situation of the object O, and the like. For example, the management device 40 can receive the order information from the user and transmit the order information to the handling device 10 and the control device 30. The management device 40 may generate one or more picking lists for the handling device 10 on the basis of the order information. The control device 30 can feed back information such as the control history and the operation result of the handling device 10 to the management device 40.

Next, an operation process of the handling system 1 will be described with reference to FIGS. 3 to 13.

Figure 3:
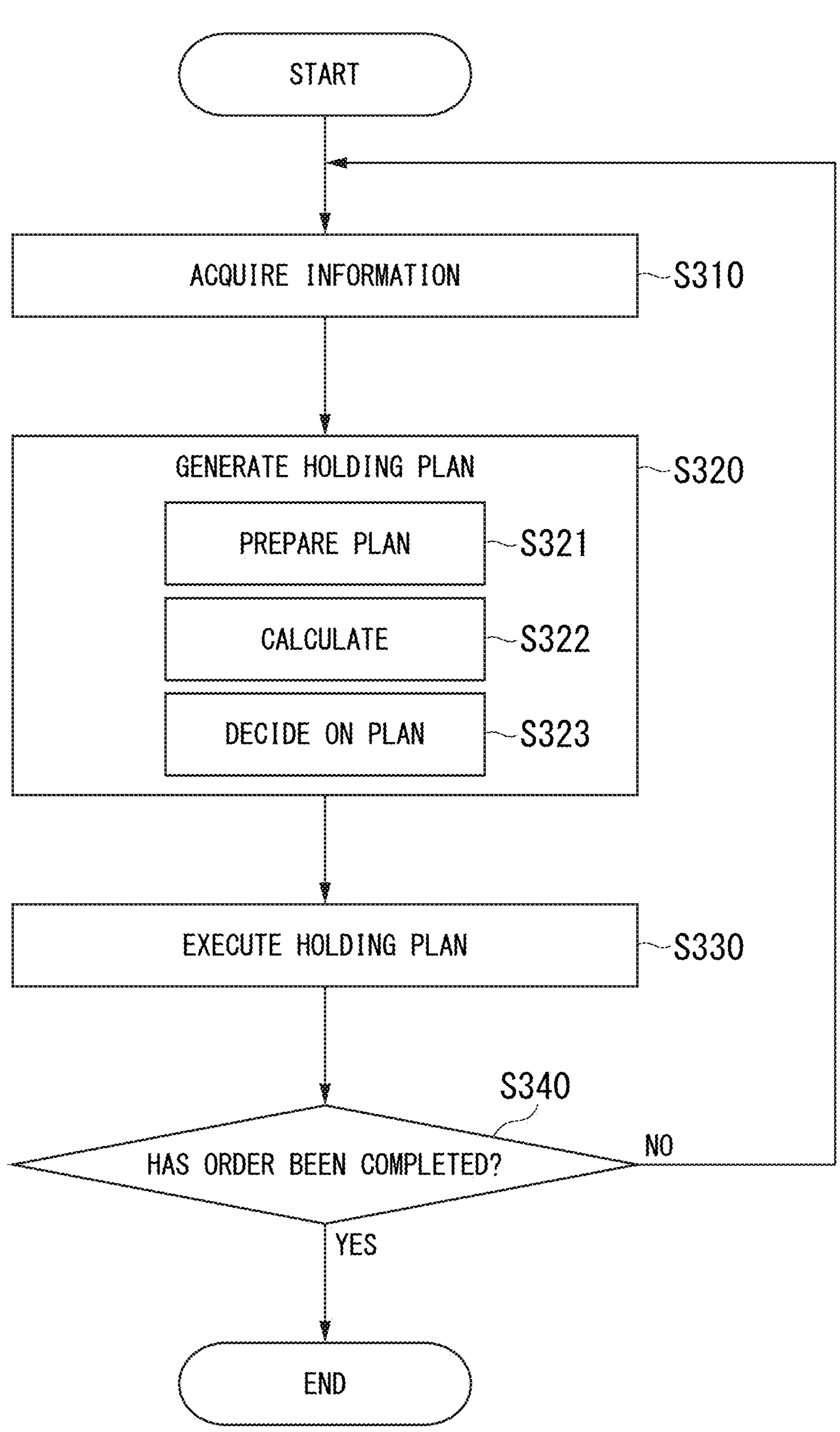
FIG. 3 is a flowchart showing an operation flow of the handling system according to the embodiment.

FIG. 3 is a flowchart showing an operation flow of the handling system 1 according to the embodiment.

Figure 4:
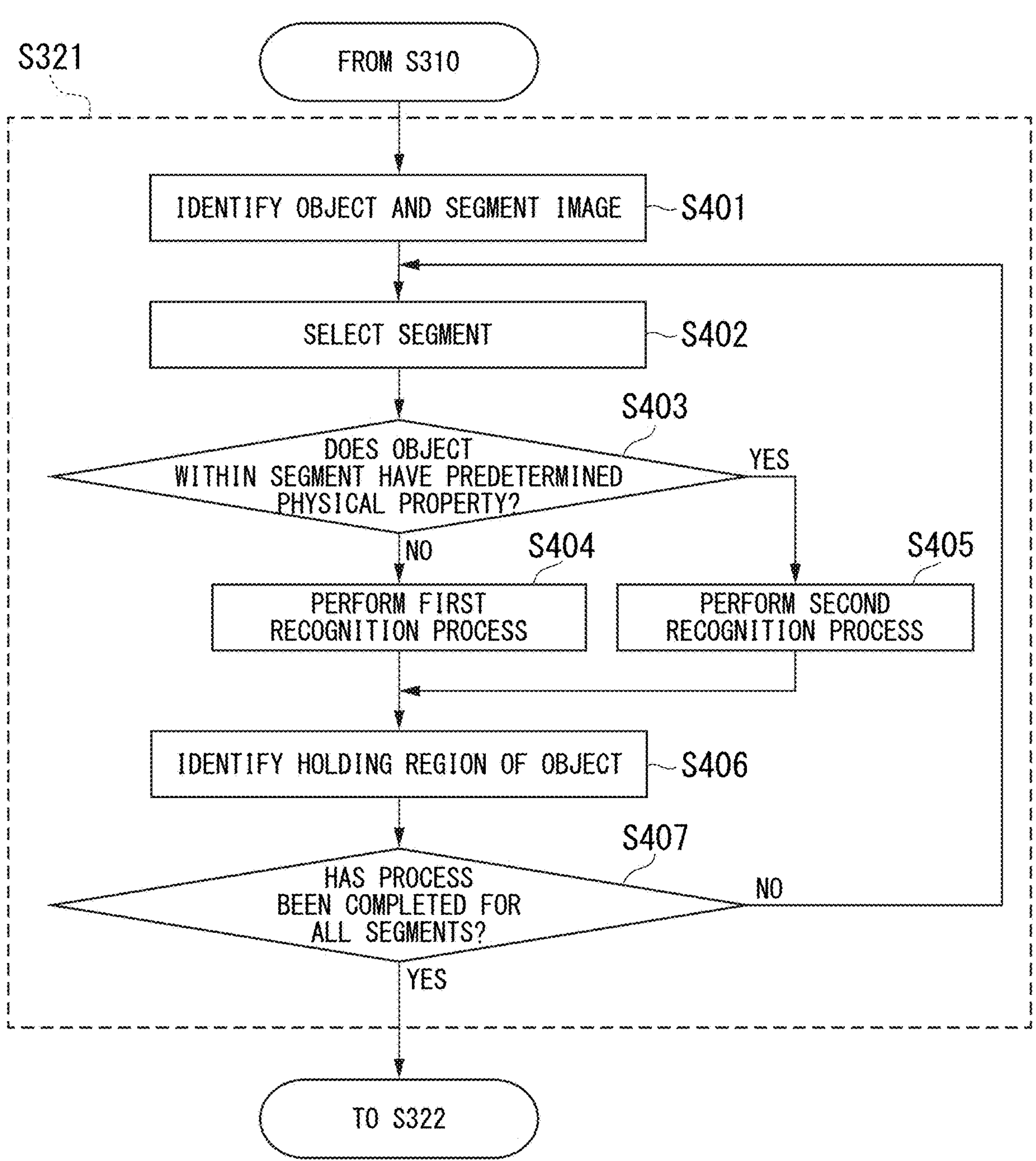
FIG. 4 is a flowchart showing an operation flow of a plan preparation step of the handling system according to the embodiment.

FIG. 4 is a flowchart showing an operation flow of a plan preparation step of the handling system 1 according to the embodiment.

Figure 5:
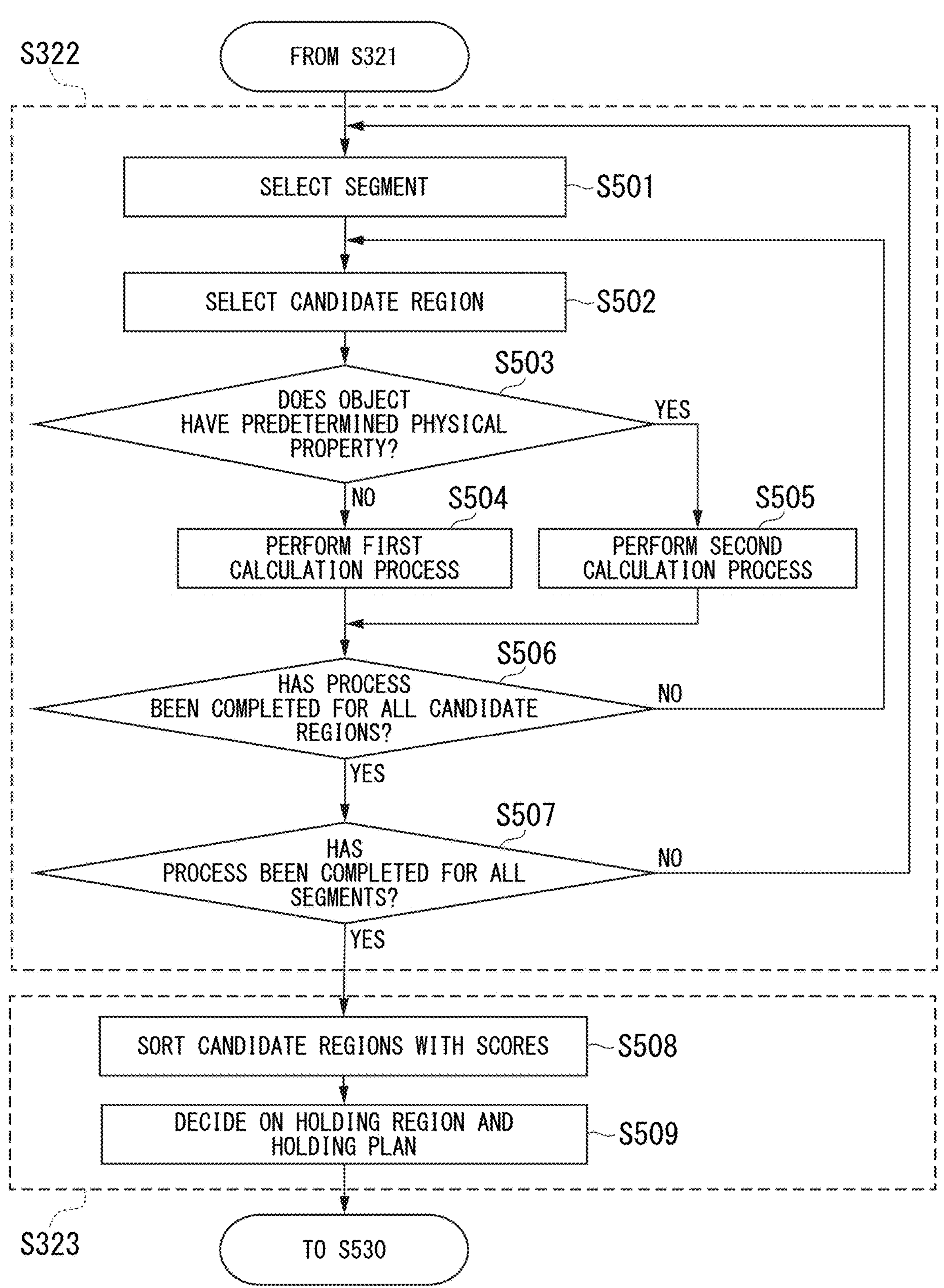
FIG. 5 is a flowchart showing an operation flow of a calculation step and a plan decision step of the handling system according to the embodiment.

FIG. 5 is a flowchart showing an operation flow of a calculation step and a plan decision step of the handling system 1 according to the embodiment.

Figure 6:
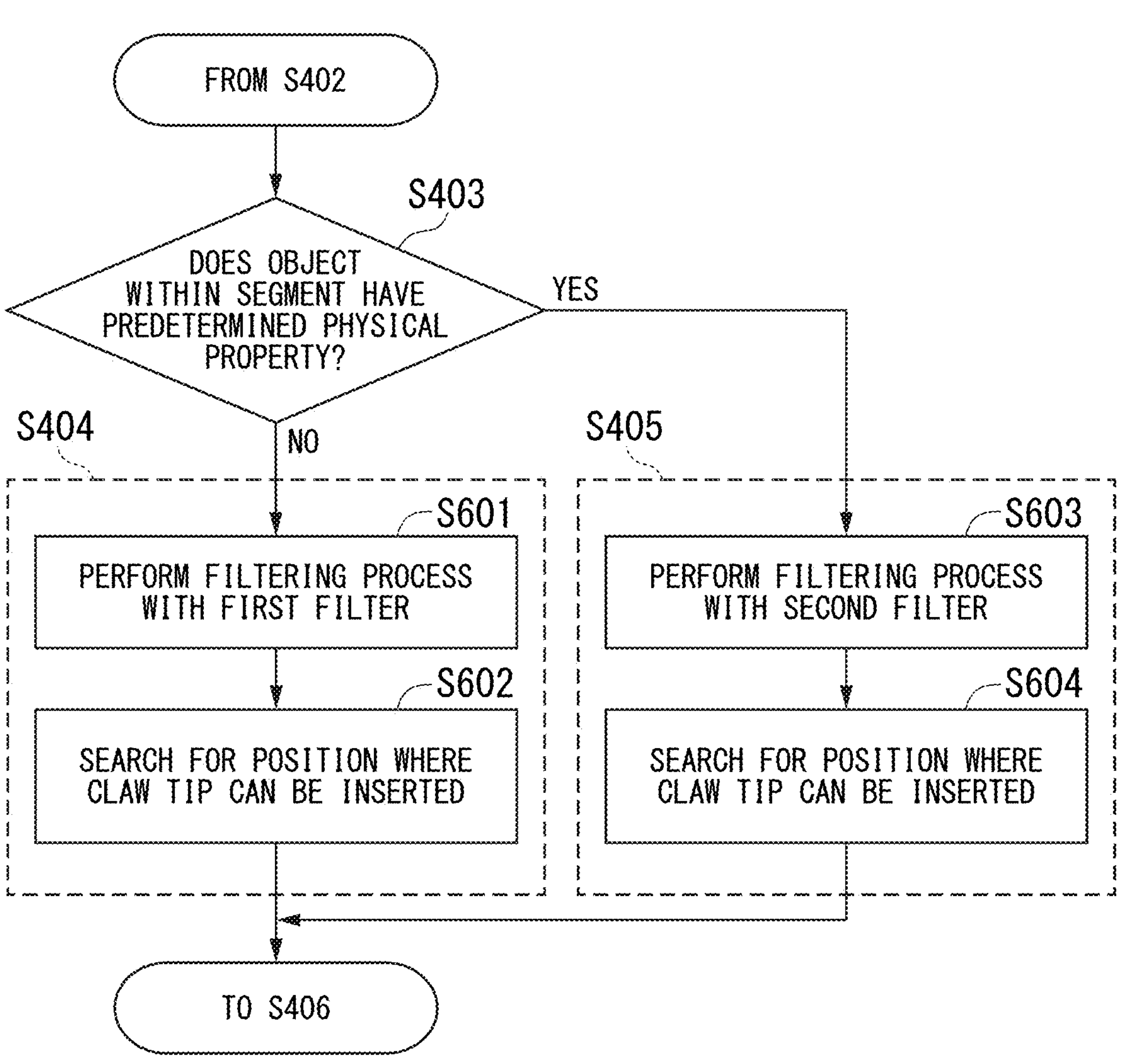
FIG. 6 is a flowchart showing an example of an operation flow of the plan preparation step of the handling system according to the embodiment.

FIG. 6 is a flowchart showing an example of an operation flow of the plan preparation step of the handling system 1 according to the embodiment.

Figure 7A:
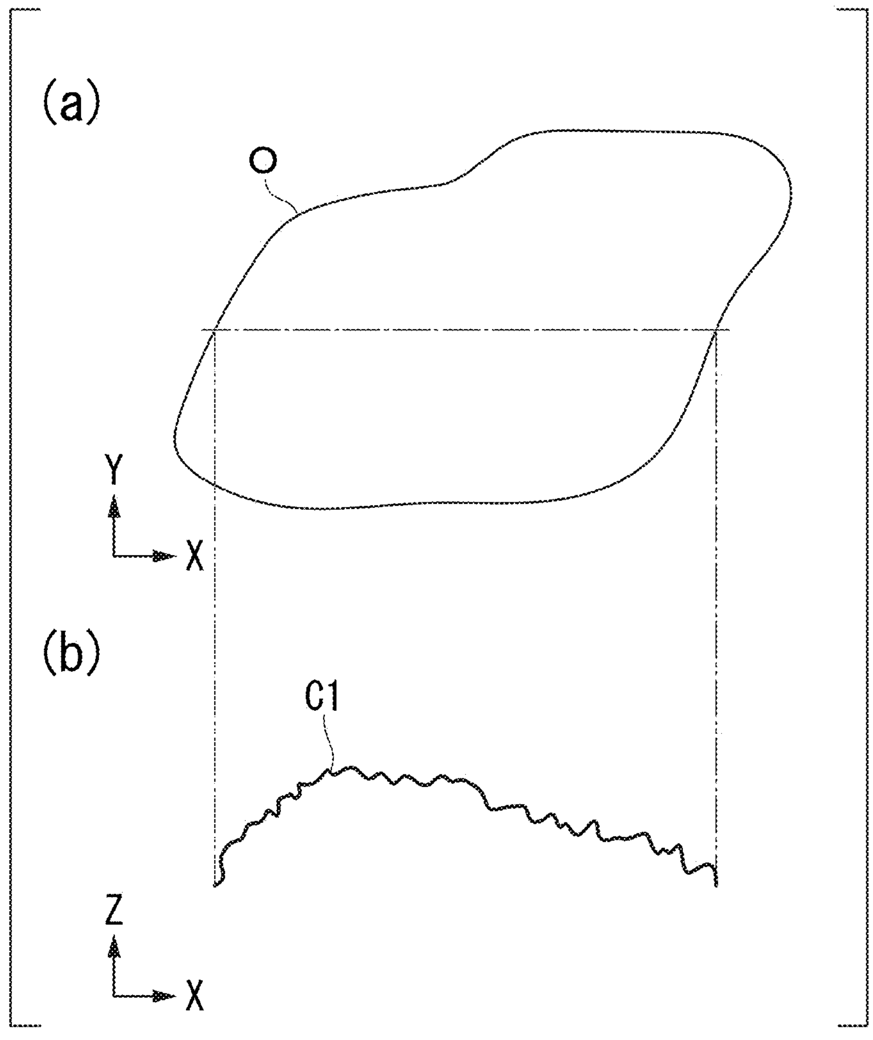
FIG. 7A is a schematic diagram showing an example of a plan preparation process of the handling system according to the embodiment.
Figure 7B:
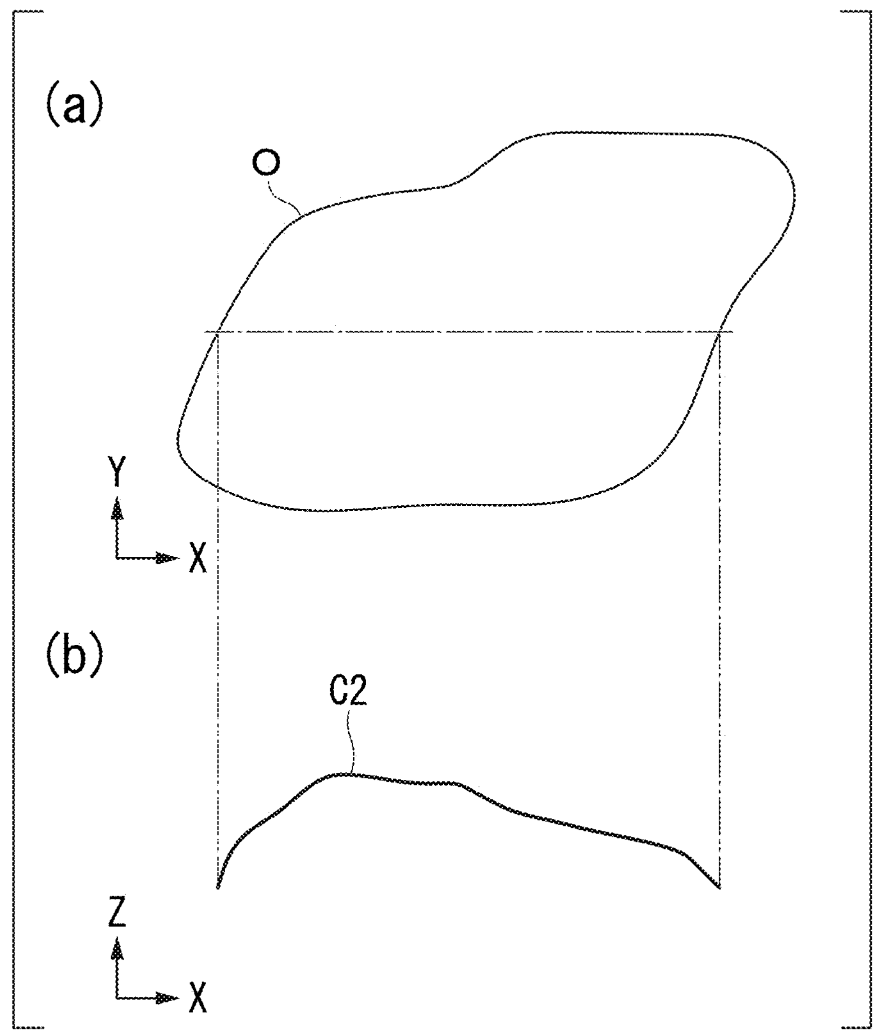
FIG. 7B is a schematic diagram showing an example of the plan preparation process of the handling system according to the embodiment.

FIGS. 7A and 7B are schematic diagrams showing examples of a plan preparation process of the handling system 1 according to the embodiment.

Figure 8:
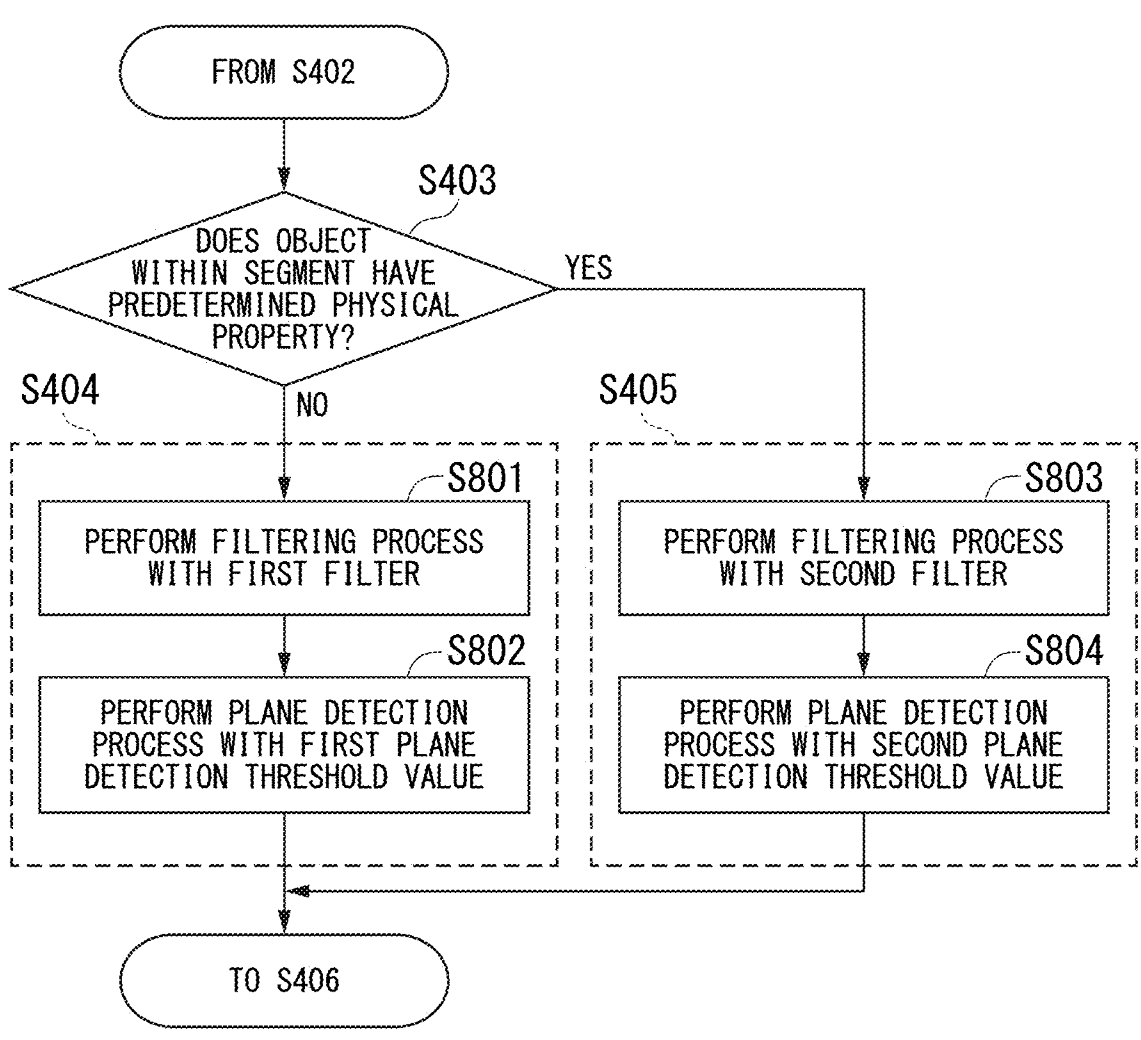
FIG. 8 is a flowchart showing an example of an operation flow of the plan preparation step of the handling system according to the embodiment.

FIG. 8 is a flowchart showing an example of an operation flow of the plan preparation step of the handling system 1 according to the embodiment.

Figure 9A:
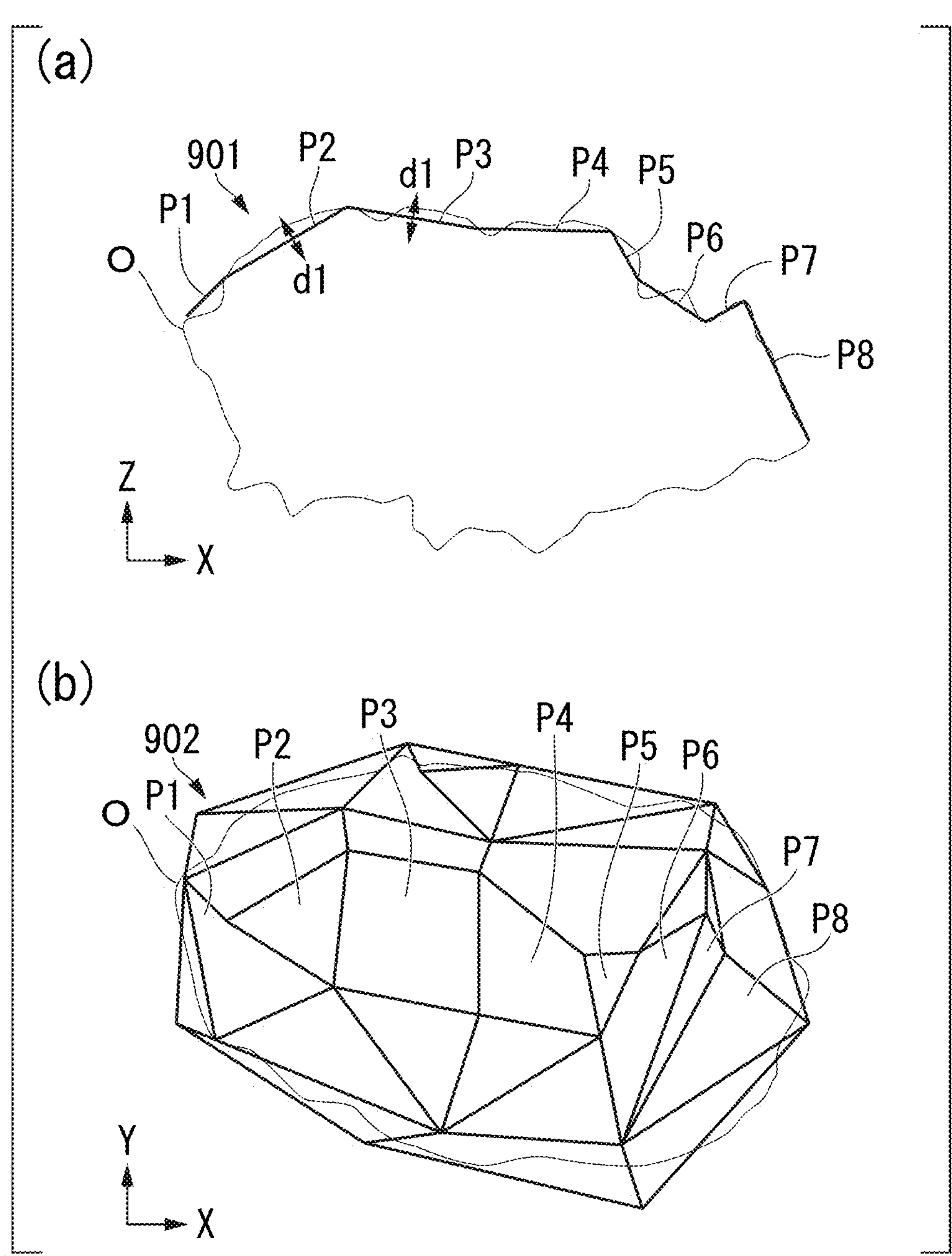
FIG. 9A is a schematic diagram showing an example of the plan preparation process of the handling system according to the embodiment.
Figure 9B:
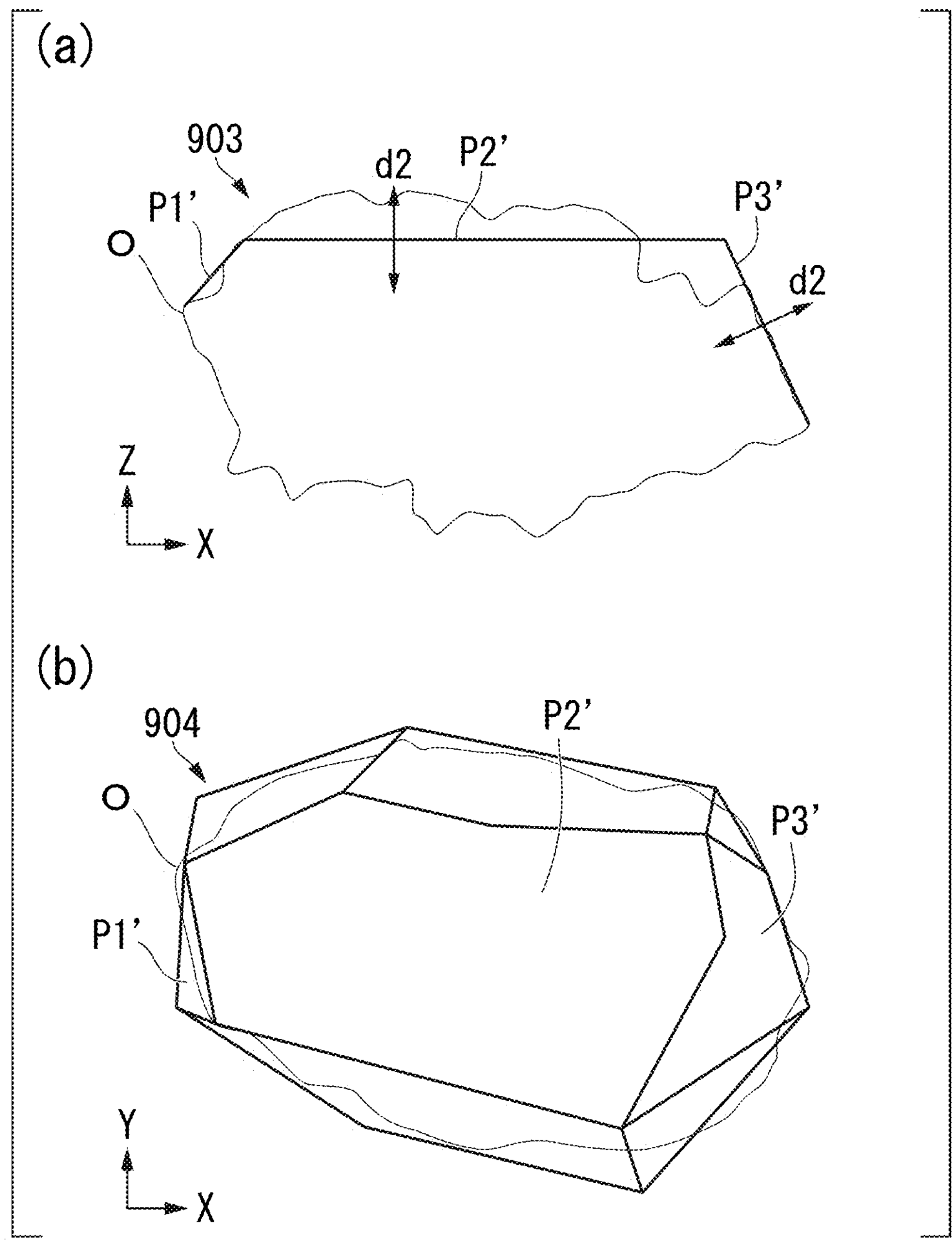
FIG. 9B is a schematic diagram showing an example of the plan preparation process of the handling system according to the embodiment.

FIGS. 9A and 9B are schematic diagrams showing examples of the plan preparation process of the handling system 1 according to the embodiment.

Figure 10:
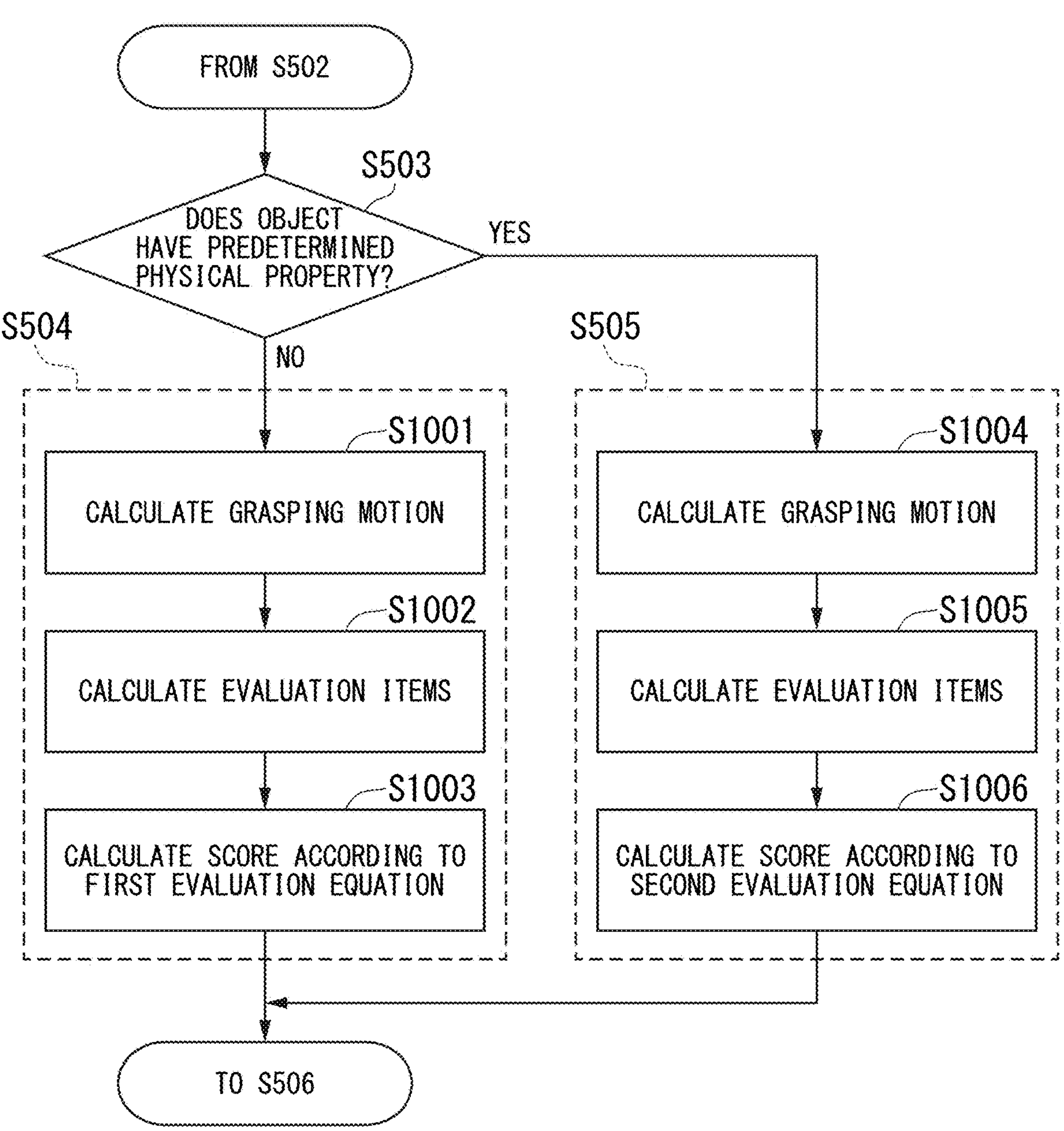
FIG. 10 is a flowchart showing an example of an operation flow of the calculation step of the handling system according to the embodiment.

FIG. 10 is a flowchart showing an example of an operation flow of the calculation step of the handling system 1 according to the embodiment.

Figure 11A:
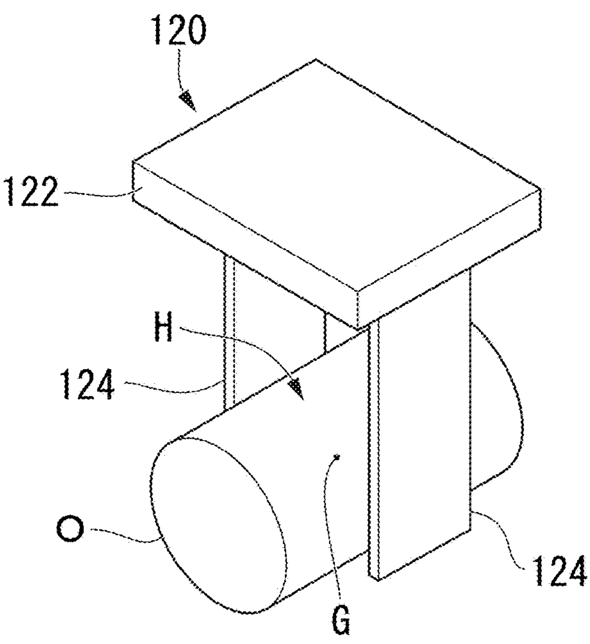
FIG. 11A is a schematic diagram showing an example of a calculation process of the handling system according to the embodiment.
Figure 11B:
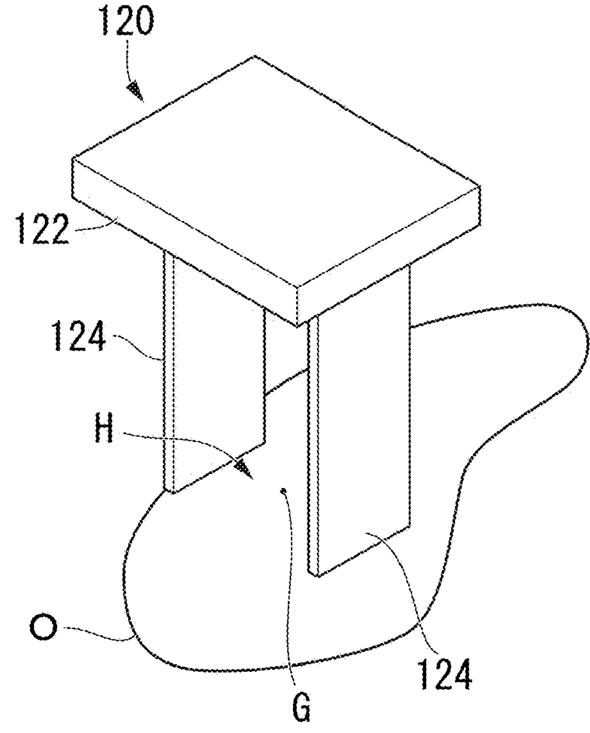
FIG. 11B is a schematic diagram showing an example of the calculation process of the handling system according to the embodiment.
Figure 11C:
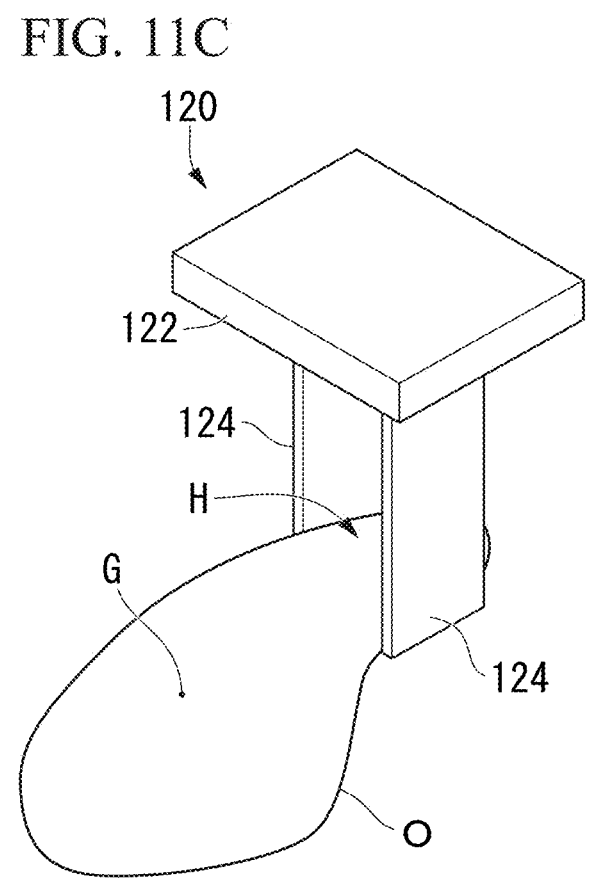

FIGS. 11A to 11C are schematic diagrams showing examples of a calculation process of the handling system 1 according to the embodiment.

Figure 12:
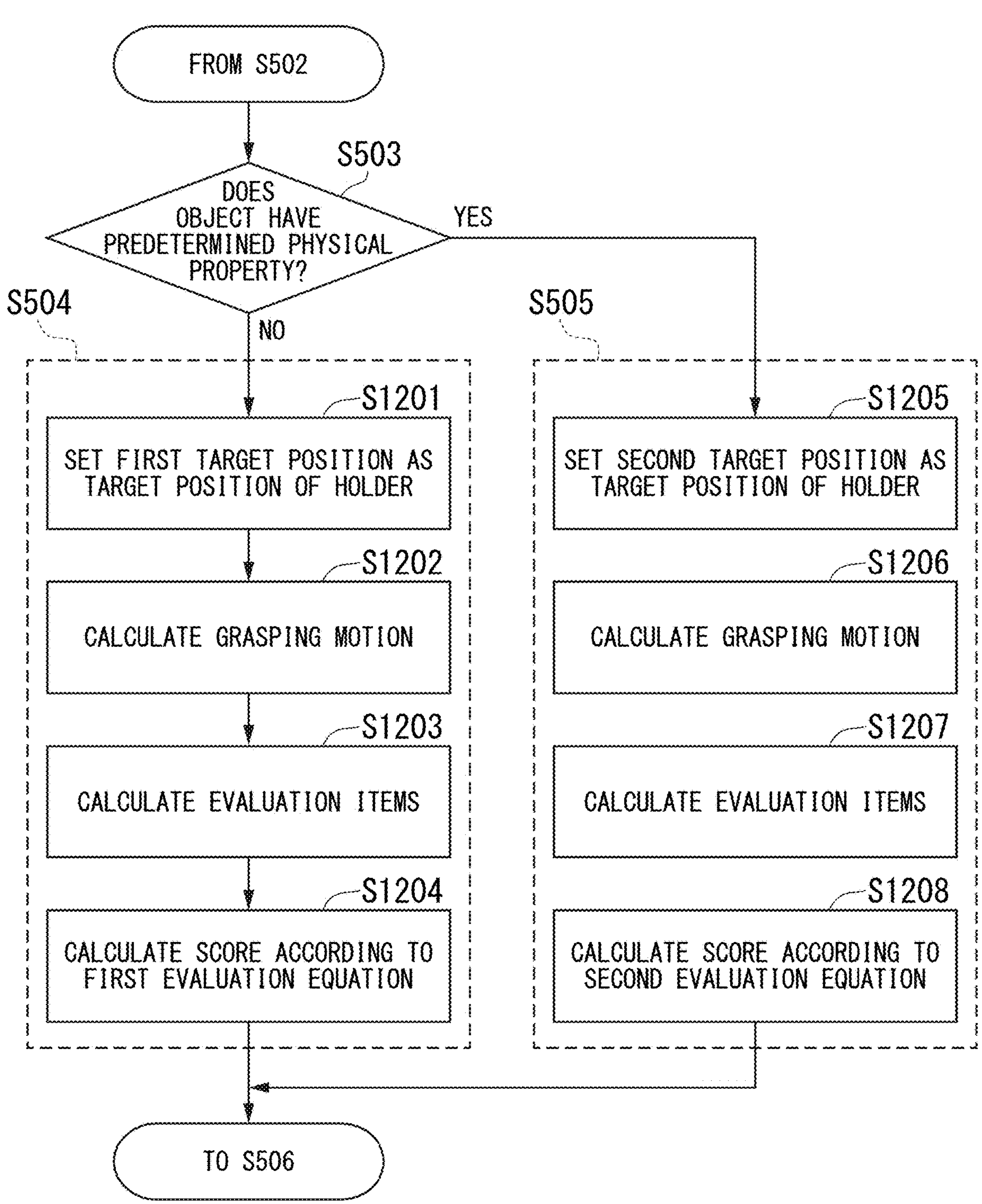
FIG. 12 is a flowchart showing an example of the operation flow of the calculation step of the handling system according to the embodiment.

FIG. 12 is a flowchart showing an example of the operation flow of the calculation step of the handling system 1 according to the embodiment.

Figure 13A:
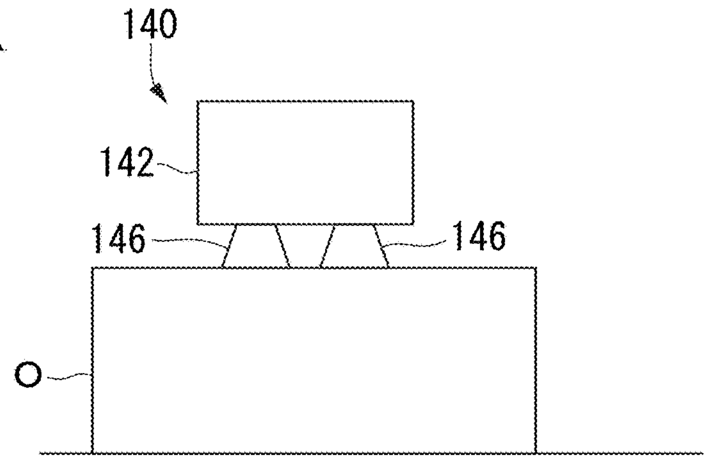
FIG. 13A is a schematic diagram showing an example of the calculation process of the handling system according to the embodiment.
Figure 13B:
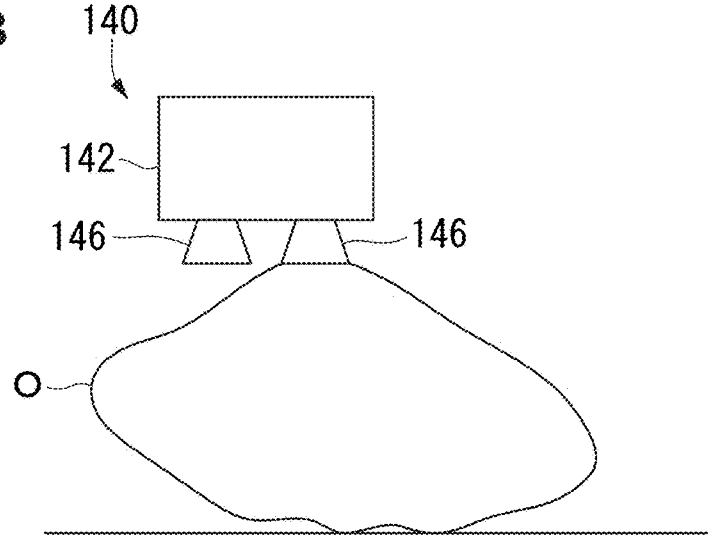
FIG. 13B is a schematic diagram showing an example of the calculation process of the handling system according to the embodiment.
Figure 13C:
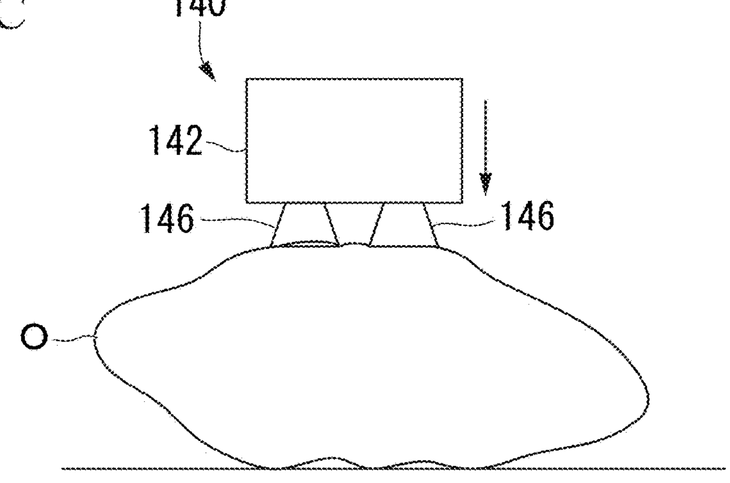
FIG. 13C is a schematic diagram showing an example of the calculation process of the handling system according to the embodiment.

FIGS. 13A to 13C are schematic diagrams showing examples of the calculation process of the handling system 1 according to the embodiment.

First, a flow of an overall process of the handling system 1 will be described with reference to FIG. 3. As shown in FIG. 3, in step S310, the acquirer 300 acquires order information from the management device 40 or the user, information about the type or physical properties of the object O, a detection result (e.g., image data of the object O in the extraction source container V1) of each of the sensors 20 to 26, and the like. Then, in step S320, the planner 310 generates a holding plan for holding the object O by the holder 100. Specifically, the step S320 includes steps S321 to S323. In step S321, the plan preparer 320 processes the information acquired by the acquirer 300 to calculate the holding plan. In step S322, the calculator 330 performs various types of calculation for generating a holding plan on the basis of the information processed by the plan preparer 320. In step S323, the plan decider 340 decides a holding plan to be actually executed on the basis of a calculation result of the calculator 330. Subsequently, in step S330, the executor 350 instructs the handling device 10 to grasp the object O on the basis of the decided holding plan and to move the object O from the extraction source container V1 to the transport destination container V2. After the holding and transport motions on the object O by the handling device 10 are completed, the control device 30 determines whether all orders have been completed in step S340. In a case in which it is determined that the orders have not been completed (S340: NO), the acquirer 300 acquires information again (S310). In a case in which it is determined that all orders have been completed (S340: YES), the control device 30 ends the control of the handling device 10.

Subsequently, an operation process of the plan preparation step (S321) of the handling system 1 will be described with reference to FIG. 4. The plan preparation step S321 may be executed after the information acquisition step S301. As shown in FIG. 4, first, in step S401, the recognizer 322 receives image data of the extraction source container V1 from the acquirer 300. The recognizer 322 performs an image recognition process, thereby recognizing the object O in the image. In a case in which the image includes a plurality of objects O, the recognizer 322 divides the image into a plurality of segments for each of the objects O. In step S402, the recognizer 322 selects a target segment among the plurality of segments. In step S403, the recognizer 322 determines whether or not the object O within the selected segment has a predetermined physical property on the basis of information about physical properties of the object O acquired by the acquirer 300. For example, the recognizer 322 determines whether or not the object O within the segment has flexibility or deformability of a certain level or higher. In a case in which it is determined that the object O does not have a predetermined physical property (S403: NO), the recognizer 322 executes a first recognition process for the normal object O in step S404. On the other hand, in a case in which it is determined that the object O has the predetermined physical property step (S403: YES), the recognizer 322 executes a second recognition process as an exceptional process for the object O having the predetermined physical property in step S405. Content of the first recognition process and the second recognition process will be described below. After the recognition process, in step S406, the region identifier 324 identifies a region where the holder 100 can grasp the object O on the basis of a result of the recognition process. In step S407, the plan preparer 320 determines whether or not the recognition process has been completed for all segments. In a case in which it is determined that the recognition process has not been completed (S407: NO), the process returns to step S402 and the recognizer 322 selects a target segment again. In a case in which it is determined that the recognition process has been completed for all segments (S407: YES), the plan preparer 320 determines that pre-processing for the calculation process has been completed and moves to the calculation step S322 (FIG. 5).

Here, specific examples of the first recognition process and the second recognition process will be described with reference to FIGS. 6 to 9. FIGS. 6, 7A, and 7B show an example in which the pincher 120 pinches the object O and FIGS. 8, 9A, and 9B show an example in which the adsorber 140 adsorbs and holds the object O.

In a case in which the pincher 120 is used, the recognizer 322 performs a filtering process for the image data using a first filter in step S601 in the first recognition process (step S404) in a case in which it is determined that the object O does not have a predetermined physical property (S403: NO) as shown in FIG. 6. The first filter may be a general filter as described above. Subsequently, in step S602, the region identifier 324 searches for a position where the tip of the pinching claw 124 can be inserted on the basis of image data subjected to the filtering process.

On the other hand, in the second recognition process (step S405) in a case in which it is determined that the object O has a predetermined physical property (S403: YES), the recognizer 322 executes the filtering process for the image data using the second filter in step S603. The second filter is an image filter different from the first filter. For example, the second filter has higher strength than the first filter. Therefore, a filtering process stronger than the first recognition processing can be performed in the second recognition process. Subsequently, in step S604, the region identifier 324 searches for a position where the tip of the pinching claw 124 can be inserted on the basis of the image data subjected to the filtering process.

A difference between the first recognition process and the second recognition process in a case in which the pincher 120 is used will be further described with reference to FIGS. 7A and 7B. FIGS. 7A and 7B show a top view (a) of the object O along an XY plane and a contour shape (b) in the depth direction (the Z-direction) of the top surface of the object O along a single-dot-dashed line in the top view in association in a case in which distance image data of the object O including information of the depth direction (the Z-direction) is acquired. The contour shape in the depth direction is generated on the basis of depth direction information included in the data after the filtering process for the distance image data. FIG. 7A (b) shows an upper surface contour shape C1 of the object O obtained in the first recognition process using the first filter. FIG. 7B (b) shows an upper surface contour shape C2 of the object O obtained in the second recognition process using the second filter. The contour shape C2 of FIG. 7B (a) using the second filter having large filtering strength is smoothed in comparison with the contour shape C1 of FIG. 7A (b).

For example, if the physical properties of step S403 are properties related to flexibility and deformability, the flexible object O is not only more finely irregular than the non-flexible object O, but it is also often packaged in a glossy bag such as a polybag. Therefore, in a case in which a recognition setting for the non-flexible object O is used for the flexible object O as it is, a large amount of noise may be detected and the recognition may fail. For example, there is a possibility that intense irregularities different from those of the actual object O will be detected in the depth direction of the object O due to the gloss of the outer cover. In this case, in a case in which the pincher 120 tries to pinch the object O, there is a possibility that a protrusion portion that is actually absent will be identified as a holding region.

Therefore, in the second recognition process, the recognizer 322 uses the second filter for the flexible object O, thereby strongly setting the noise filter and reducing local irregularities of the image data. Thereby, a holding region suitable for a pinching process of the pincher 120 can be easily detected and a preferable holding region can be identified. That is, the recognizer 322 can decide a reference of the filtering process for the image data on the basis of the physical properties (e.g., flexibility) of the object O in image recognition. For example, the recognizer 322 can determine whether or not the object O is a flexible object. The recognizer 322 can perform the first filtering process in a case in which it is determined that the object O is not a flexible object and can perform the second filtering process stronger than the first filtering process in a case in which it is determined that the object O is a flexible object.

In a case in which the adsorber 140 is used, the recognizer 322 performs a filtering process for the image data using the first filter as in the case of FIG. 6 in step S801 in the first recognition process (step S404) in a case in which it is determined that the object O does not have a predetermined physical property (step S403: NO) as shown in FIG. 8. The first filter may be the general filter as described above. In addition, the filtering process may be omitted. Subsequently, in step S802, the recognizer 322 executes a plane detection process using a first plane detection threshold value for the image data after the filtering process. Specifically, the recognizer 322 detects a region recognized as including irregularities of the first plane detection threshold value or less on the surface of the object O in the image as a planar region as described above. The region identifier 324 identifies a holding region with the adsorber 140 in a matching calculation process for the detected planar region and the adsorption hand 142.

On the other hand, in the second recognition process (step S405) in a case in which it is determined that the object O has a predetermined physical property (S403: YES), the recognizer 322 performs a filtering process for the image data using the second filter in step S803. For example, the second filter is an image filter different from the first filter and has higher strength than the first filter. Therefore, a filtering process stronger than the first recognition process can be performed in the second recognition process. The filtering process may be omitted. Subsequently, in step S804, the recognizer 322 executes a plane detection process using a second plane detection threshold value for the image data after the filtering process. The second plane detection threshold value is a plane detection threshold value different from the first plane detection threshold value. For example, the second plane detection threshold value is larger than the first plane detection threshold value. Therefore, in the second recognition process, a planar region larger than that of the first recognition process can be detected.

A difference between the first recognition process and the second recognition process in a case in which the adsorber 140 is used will be further described with reference to FIG. 9A and FIG. 9B. FIG. 9A and FIG. 9B show examples of the plane detection process in a case in which distance image data of the object O including information in a depth direction (Z-direction) has been acquired. Specifically, FIG. 9A (a) is a side view 901 of the object O showing a result of plane detection of the object O using a first plane detection threshold value d1. FIG. 9A (b) is a top view 902 of the object O indicating a result of plane detection of the object O using the first plane detection threshold value d1. FIG. 9B (a) is a side view 903 of the object O showing a result of plane detection of the object O using a second plane detection threshold value d2. FIG. 9B (b) is a top view 904 of the object O indicating a result of plane detection of the object O using the second plane detection threshold value d2. As shown in FIG. 9A (a), in the first recognition process, a plane detection process using a relatively small first plane detection threshold value d1 (e.g., d1=5 mm) is executed. As a result, the upper surface of the object O is divided into eight planes P1 to P8 as shown in FIG. 9A (a) and many relatively small planar regions are detected as shown in FIG. 9A (b). On the other hand, as shown in FIG. 9B (a), in the second recognition process, the plane detection process using a relatively large second plane detection threshold value d2 (e.g., d1=10 mm) is executed. As a result, the upper surface of the object O is divided into three planes P1 to P3 as shown in FIG. 9B (a) and a relatively large planar region is detected as shown in FIG. 9B (b).

For example, if the physical properties of step S403 are properties related to flexibility and deformability, because the flexible object O often has a shiny and complex irregular surface, the detected plane may be significantly subdivided in a case in which the first plane detection threshold value similar to that of the non-flexible object O is used. In a case in which the plane detected in this way is small for the adsorption hand 142 and the individual adsorption pads 146, the adsorption of the object O by the adsorption hand 142 can be difficult. Moreover, because the flexible object O can be easily deformed when the adsorption hand 142 is pressed, fine plane detection may not be effective. Therefore, in the second plane detection process, the recognizer 322 performs plane detection using a relatively large second plane detection threshold value with respect to the flexible object O, thereby allowing the holding region of the adsorption hand 142 to have relatively larger irregularity than the non-flexible object O. Thereby, the recognizer 322 can detect a large planar region suitable for adsorption in comparison to the first plane detection process. That is, in image recognition, the recognizer 322 can decide a reference for detecting a planar region in the image on the basis of the physical properties (e.g., flexibility) of the object O. For example, the recognizer 322 can determine whether or not the object O is a flexible object, perform the first plane detection process in the image recognition in a case in which it is determined that the object O is not a flexible object, and perform the second plane detection process in the image recognition in a case in which it is determined that the object O is a flexible object. At least one of criteria for determining the plane in the second plane detection process may be looser than in the first plane detection process (i.e., it may be easy to determine that the specific region is a planar region).

Likewise, even if the region identifier 324 identifies the holding region, the region identifier 324 can identify a larger planar region in the second recognition process than in the first recognition process as an adsorption region (i.e., a holding region) where the adsorber 140 performs adsorption and holding processes. That is, the region identifier 324 can decide a reference for identifying the holding region on the basis of the physical properties (e.g., flexibility) of the object O.

Next, an operation process of a calculation step (S322) and a plan execution step (S323) of the handling system 1 will be described with reference to FIG. 5. The calculation step S322 may be executed after the plan preparation step S321. As shown in FIG. 5, first, in step S501, the calculator 330 selects a segment serving as a calculation target in an image. In step S502, the calculator 330 selects a candidate region serving as the calculation target from one or more candidate regions included in the selected segment and identified by the region identifier 324. In step S503, the calculator 330 determines whether or not the object O having the selected candidate region has a predetermined physical property on the basis of the information about the physical properties of the object O acquired by the acquirer 300. For example, the calculator 330 determines whether or not the object O within the segment has flexibility or deformability of a predetermined level or higher. In a case in which it is determined that the object O does not have a predetermined physical property (S503: NO), the calculator 330 executes a first calculation process for the normal object O in step S504.

Specifically, the calculator 330 can execute a process of calculating a candidate plan including the motion of the handling device 10 for the selected candidate region and a score calculation process for the candidate plan. On the other hand, in a case in which it is determined that the object O has a predetermined physical property (S503: YES), the calculator 330 executes a second calculation process as an exceptional process for the object O having the predetermined physical property in step S505. Specifically, the calculator 330 can calculate the candidate plan and the score of the candidate plan for the selected candidate region as in the first calculation process. Content of the first calculation process and the second calculation process will be described below. After the calculation process, in step S506, the calculator 330 determines whether or not the calculation process has been completed for all candidate regions within the selected segment. In a case in which it is determined that the calculation process has not been completed (S506: NO), the process returns to step S502 and the calculator 330 selects a target candidate region again. In a case in which it is determined that calculation processing has been completed for all candidate regions within the selected segment (S506:

YES), the calculator 330 determines whether or not the calculation process has been completed for all segments in step S507. In a case in which it is determined that the calculation process has not been completed (S507: NO), the process returns to step S501 and the calculator 330 selects a target segment again. In a case in which it is determined that the calculation process has been completed for all segments (S507: YES), the calculator 330 determines that the calculation process has been completed and moves to plan decision step S323. The calculator 330 can calculate a corresponding candidate plan and a score of the candidate plan for each of the candidate regions identified by the region identifier 324 by executing the calculation process for all segments in this way.

As shown in FIG. 5, the plan decider 340 sorts a list of candidate plans calculated by the calculator 330 for each candidate region with a score in step S508 included in step S323. Subsequently, in step S509, the plan decider 340 selects a candidate plan to be actually executed as a holding plan from a list of candidate plans arranged in the order of scores. The plan decider 340 determines a candidate region corresponding to the selected candidate plan as a holding region. For example, the plan decider 340 selects a candidate plan having the highest score as the holding plan. In this way, the plan decider 340 can decide on a holding region and a holding plan for actually performing a holding process. Subsequently, the process moves to plan execution step S330. In addition, in a case in which the handling device 10 includes both the pincher 120 and the adsorber 140, the calculator 330 can calculate each candidate plan using the pincher 120 and its score and each candidate plan using the adsorber 140 and its score in parallel. The plan decider 340 may arrange calculated candidate plans in the same list and sort the candidate plans with scores regardless of the type of the holder 100 to be used (the pincher 120 or the adsorber 140).

Here, specific examples of the first calculation process and the second calculation process are described with reference to FIGS. 10 to 13. FIGS. 10 and 11A to 11C show examples in which the pincher 120 pinches the object O and FIGS. 12 and 13A to 13C show examples in which the adsorber 140 adsorbs and holds the object O.

In a case in which the pincher 120 is used, as shown in FIG. 10, in the first calculation process (step S504) in a case in which it is determined that the object O does not have a predetermined physical property (S503: NO), the motion calculator 332 executes a calculation process necessary for a motion in which the pincher 120 grasps a candidate region of the object O in step S1001. Specifically, the motion calculator 332 calculates a target position of the pincher 120, a movement route to the target position, a posture of the pincher 120 during holding, an amount of opening and an amount of insertion of the pinching claw 124, and the like. Subsequently, in step S1002, the score calculator 334 calculates evaluation items (e.g., the components a1 to a9) for the above-described score calculation. Subsequently, in step S1003, the score calculator 334 calculates a score Sa using the first evaluation equation on the basis of each of the calculated evaluation items.

On the other hand, in the second calculation process step (S505) in a case in which it is determined that the object O has a predetermined physical property (S503: YES), the motion calculator 332 executes a calculation process required for a motion in which the pincher 120 grasps the candidate region of the object O in step S1004. In step S1005, the score calculator 334 calculates evaluation items for the above-described score calculation process. Subsequently, in step S1006, the score calculator 334 calculates the score Sa using the second evaluation equation on the basis of the calculated evaluation items. The second evaluation equation is different from the first evaluation equation. For example, in the second evaluation equation, weights of one or more components (evaluation items) included in the equation are different from the weight of the first evaluation equation. Specifically, in the second evaluation equation, the weight p1 of the score component a1 related to "the distance between the contact point between the pinching claw 124 and the object O and the center-of-gravity position of the object O" can be set to 0 or a value smaller than the corresponding weight p1 of the first evaluation equation.

A difference between the first calculation process and the second calculation process in a case in which the pincher 120 is used will be further described with reference to FIGS. 11A to 11C. Here, an example in which the physical properties of step S503 are properties related to flexibility and deformability is taken. FIG. 11A shows a motion model in which the pincher 120 pinches the object O, which is highly rigid (i.e., hardly deformable), in the first calculation process. FIG. 11B and FIG. 11C show a motion model in which the pincher 120 pinches the object O which is flexible and easily deformed in the second calculation process. FIGS. 11A to 11C show a simplified shape of the pinching hand 122.

In an example shown in FIG. 11A, the pincher 120 pinches the object O having high rigidity. In this case, if a holding region H where the pinching claws 124 perform a pinching process is separated from the center-of-gravity position G of the object O, the stability of the grasping motion can be reduced because the pinching hand 122 receives large torque from the object O when the object O is held and transported. Thus, the score calculator 334 calculates the score component a1 related to "the distance between the contact point between the pinching claw 124 and the object O and the center-of-gravity position of the object O" and calculates the score Sa so that the score Sa increases as the distance between the holding region H and the center-of-gravity position G decreases.

On the other hand, in the examples shown in FIG. 11B and FIG. 11C, the pincher 120 pinches the object O which is highly flexible and easily deformed. In this case, even if the pincher 120 picks up the vicinity of the end of the object O slightly distant from the center-of-gravity position G, the object O can be gravitationally deformed. Thus, the pincher 120 can perform a stable motion without receiving excessive torque from the object O when the object O is held and transported. However, in a case in which the first evaluation equation in the first calculation process is used with respect to the candidate region H away from the center-of-gravity position G, the evaluation component a1 based on the distance between the candidate region H and the center-of-gravity position G is reduced. Thus, the candidate region H is not easily selected as a holding region by the plan decider 340 because the score Sa thereof is evaluated to be small. Therefore, in the second calculation process, the score calculator 334 can use the second evaluation equation in which the contribution of the score component a1 is reduced in the calculation of the score Sa. Thereby, the score calculator 334 can appropriately calculate the score Sa of the candidate region H in accordance with the effectiveness of the pinching motion even for the candidate region H having a relatively large distance from the center-of-gravity position G. That is, the score calculator 334 can decide the content of score calculation for evaluating the candidate region or the candidate plan on the basis of the physical properties (e.g., flexibility) of the object O. For example, the calculator 330 can determine whether or not the object O is a flexible object, calculate the score of the candidate plan using the first evaluation equation in a case in which it is determined that the object O is not a flexible object, and calculate the score of the candidate plan using the second evaluation equation in a case in which it is determined that the object O is a flexible object. In the second evaluation equation, a magnitude of the contribution of the evaluation item related to at least the center-of-gravity position G of the object O can be different from that in the first evaluation equation.

The second evaluation equation can be an evaluation equation obtained by arbitrarily modifying the first evaluation equation so that the contribution of the score component a1 related to the center-of-gravity position G of the object O is reduced. For example, in the calculation of a1, the distance between the candidate region H and the center-of-gravity position G may be regarded as a minimum value or a certain value. Alternatively, in the calculation of a1, a dead zone may be provided at a distance between the candidate region H and the center-of-gravity position G. For example, in a case in which the distance is within a predetermined numerical range (dead zone), a predetermined value is used as the distance or the value of a1. Alternatively, in the second evaluation equation, the weight p1 of a1 in the first evaluation equation may be changed. For example, p1 in the second evaluation equation can be set to zero or a value smaller than p1 in the first evaluation equation. Such modification of the evaluation equation may be executed only under predetermined conditions. For example, the score calculator 334 may determine that the insertion of the pinching claw 124 for pinching the object O is sufficient only in a case in which the estimated amount of entry of the pinching hand 122 into the candidate region H (e.g., the amount of insertion of the tip of the pinching claw 124) exceeds a predetermined threshold value, and use the modified evaluation equation as described above.

Thereby, a high score can be output even for the candidate region H separated from the center-of-gravity position G. This is a simple calculating expression of the fact that in a case in which the flexible object O is picked up by the pincher 120, the object O itself is deformed according to a weight before torque is generated on a contact surface inside of the pinching claw 124, unlike a case where the object O is a rigid body. Thereby, in a case in which this object O is pinched, the handling device 10 is permitted to perform a motion of pinching the end of the object O instead of the vicinity of the center-of-gravity position G of the object O.

Moreover, in a case in which the object O is an article packaged with an outer package such as a polybag, the contour of the object O may be recognized to be wider than the contour of the article itself due to the noise caused by the reflection and irregularity of the surface. A width of the object O is often large especially near the center-of-gravity position G of the object O and a contour width of the object O may exceed a limit of an opening width of the pinching claw 124 as shown in FIG. 11B. In this case, such a candidate region His excluded from a holding target. In this case, it may be effective to select a candidate region H away from the center-of-gravity position G as shown in FIG. 11C as a holding region. However, as described above, in a case in which the first evaluation equation is used, the score calculator 334 may underestimate the score Sa of such a candidate region H. As a result, the planner 310 cannot generate a valid candidate plan. On the other hand, in a case in which the second evaluation equation is used, the score calculator 334 can more appropriately evaluate the effectiveness of the candidate region H as shown in FIG. 11C.

In a case in which the adsorber 140 is used, in the first calculation process (step S504) in a case in which it is determined that the object O has no predetermined physical property as shown in FIG. 12 (S503: NO), the motion calculator 332 sets a first target position as a target position to which the holder 100 (i.e., the adsorber 140) moves in step S1201. For example, the first target position is a position on the surface of the object O. In step S1202, the motion calculator 332 calculates a grasping motion other than the target position as in FIG. 10. In step S1203, the score calculator 334 calculates each evaluation item as in FIG. 10. In step S1204, the score calculator 334 calculates the score Sb using the first evaluation equation, as shown in FIG. 10.

On the other hand, in the second calculation process (step S505) in a case in which it is determined that the object O has a predetermined physical property (S503: YES), the motion calculator 332 sets a second target position as the target position of the holder 100 (i.e., the adsorber 140) in step S1205. The second target position is different from the first target position. For example, the second target position is a position inside of the object O. In a case in which the internal position of the object O is set to the target position in such a manner, the adsorber 140 presses the surface of the object O inward during a process of movement toward the target position. In step S1206, the motion calculator 332 calculates a grasping motion at a position other than the target position. In step S1207, the score calculator 334 calculates each evaluation item. In step S1208, the score calculator 334 uses the second evaluation equation to calculate the score Sb. The second evaluation equation may be different from the first evaluation equation. For example, the second evaluation equation can have weights of some evaluation items different from those of the first evaluation equation (e.g., the weight q1 of the score component b1 is small) as described with reference to FIG. 10 and FIGS. 11A to 11C. In addition, in step S1208, the score calculator 334 may use an evaluation equation identical to the first evaluation equation.

A difference between the first calculation process and the second calculation process in a case in which the adsorber 140 is used will be described with reference to FIGS. 13A to 13C. Here, an example in which the physical properties of step S503 are properties related to flexibility and deformability is taken. FIG. 13A shows a motion model in which the pincher 120 pinches the object O having high rigidity (i.e., hardly deformed) in the first calculation process. FIG. 13B and FIG. 13C show a motion model in which the pincher 120 pinches the object O which is flexible and easily deformed in the second calculation process. In addition, FIGS. 13A to 13C show the simplified shape of the adsorption hand 142.

In the example shown in FIG. 13A, the adsorber 140 adsorbs and holds the object O having high rigidity. In this case, the motion calculator 332 can set the surface of the object O at a target position (the first target position) of the adsorber 140. That is, the holding region adsorbed and held by the adsorber 140 is a planar region detected on the surface of the object O.

On the other hand, in the examples shown in FIGS. 13B and 13C, the adsorber 140 adsorbs and holds the object O which is highly flexible and easily deformed. Because the object O generally has many surface irregularities, a planar region detected on the surface is easily subdivided. In this case, if the motion calculator 332 sets a relatively small planar region detected on the surface of the object O at the target position of the adsorber 140, the number of adsorption pads 146 for performing an adsorption process may be limited as shown in FIG. 13B. In this case, there is a possibility that a sufficient adsorption force will not be implemented and a stable grasping motion will not be performed. Moreover, in a case in which there are few adsorption locations of the adsorption pad 146, there is a possibility that a stress force inducing separation from the adsorption pad 146 will occur due to deformation of the flexible object O during transport. On the other hand, in step S1205, in a case in which the motion calculator 332 sets a position inside of the object O as a target position (the second target position) of the adsorber 140, the adsorption hand 142 performs adsorption and holding processes while slightly crushing the flexible object O. In this case, the holding region where the adsorber 140 performs the adsorption and holding processes is a planar region formed on the surface of the crushed object O. The planar region is different from the planar region detected on the surface of the object O before being crushed. In other words, the calculator 330 can change and decide a position and width (area) of the holding region (the adsorption region) of the object O on the basis of the physical properties of the object O. Thus, in a case in which the flexible object O is adsorbed and held by the adsorber 140, an amount of contact of the adsorption pad 146 increases as the adsorber 140 presses the adsorption pad 146 into the object O in comparison with the case where the object O is a rigid body. Thus, in the above-described control process, the adsorber 140 can increase the adsorption area and can perform adsorption and holding processes in a wider region. Thus, the stability of the grasping motion of the adsorber 140 can be improved. Moreover, a stress force generated by deformation of the object O during transport can be suppressed by increasing the number of locations where the object O is adsorbed and held by the adsorption pad 146.

The motion calculator 332 can set the second target position as described above in any method. For example, the motion calculator 332 may set a position of a predetermined depth (for example, 5 mm) from the surface of the object O as the second target position. Alternatively, the motion calculator 332 may set the grasping motion of the adsorber 140 so that the pressing motion of the adsorber 140 continues with respect to the object O until a force sensor provided on the adsorption hand 142 detects a force of a predetermined magnitude. That is, the calculator 330 can decide a degree to which the adsorber 140 presses the object O on the basis of the physical property (e.g., flexibility) of the object O. For example, the calculator 330 can determine whether or not the object O is a flexible object, set an amount by which the adsorber 140 presses the object O to a first pressing amount (which may be zero) in a case in which it is determined that the object O is not a flexible object, and set an amount by which the adsorber 140 presses the object O to a second pressing amount larger than the first pressing amount in a case in which it is determined that the object O is a flexible object.

According to the above-described embodiment, the handling system 1 can improve adaptability of the handling system 1 to various types of objects O by changing processing content of the handling system 1 side in accordance with a difference between physical properties of the objects O. A conventional handling device copes with a difference between physical properties of the objects O by providing a predetermined margin in a buffer mechanism provided in the holder and a plane detection threshold value in the recognition process. However, for example, in a case in which the surface of the object O has irregularities exceeding the margins, it may not be possible to sufficiently cope with the difference with these margins. On the other hand, the handling system 1 according to the present embodiment can plan and execute a grasping motion such as intentionally pinching the end of the object O or strongly pressing the adsorption pad 146 against the flexible object O by changing a calculation method and a control method in accordance with the physical properties of the object O. Thereby, the handling system 1 can implement a stable grasping motion and a transport motion for various objects O. Moreover, the handling system 1 can autonomously perform high-speed and stable holding and transport motions for various objects O including flexible objects.

According to an embodiment, the control device 30 decides the holding region held by the holder 100 on the basis of the physical properties of the object O. According to such a configuration, because the handling system 1 can select the holding region in accordance with the physical properties of the object O, adaptability to various objects O can be improved.

According to an embodiment, the control device 30 acquires image data of the object O and performs image recognition for the image data on the basis of the physical properties of the object O. With such a configuration, in a case in which the physical properties of the object O affect the image data, image recognition corresponding to the physical properties of the object O is possible.

According to an embodiment, in image recognition, the control device 30 performs a filtering process for image data on the basis of the physical properties of the object O. Moreover, according to an embodiment, the holder 100 includes the adsorber 140 configured to adsorb the object O and the control device 30 detects an adsorption region for the object O that can be adsorbed by the adsorber 140 and identifies the adsorption region as the holding region on the basis of the physical properties of the object O. With such a configuration, in a case in which the object O includes a large amount of fine gloss or a large number of physical irregularities causing noise of the image data, it is possible to perform image recognition suitable for the object O, for example, by executing a filtering process or an adsorption region detection process corresponding to the physical properties of the object O.

According to an embodiment, the control device 30 identifies a plurality of candidate regions of the object O as candidates for a holding region where the holder 100 performs a holding process, calculates a score for each candidate region on the basis of the physical properties of the object O, and decides the holding region where the holder 100 performs the holding process on the basis of the score. With such a configuration, adaptability to various objects O can be improved by switching the score calculation method in accordance with the physical properties of the objects O with respect to various objects O that cannot be appropriately evaluated by means of the uniform score calculation equation.

According to an embodiment, the score includes a component related to the center-of-gravity position G of the object O and the control device 30 calculates the component related to the center-of-gravity position G on the basis of the physical properties of the object O. With such a configuration, it is possible to perform a more appropriate evaluation even if the object O is rigid or flexible by switching the evaluation of the component related to the center-of-gravity position G according to the physical properties of the object O.

According to an embodiment, the holder 100 includes the pincher 120 having the pinching hand 122 configured to pinch the object O and the control device 30 calculates a score on the basis of an estimated amount of entry of the pinching hand 122 into a candidate region. With such a configuration, a probability of a failure of the grasping motion can be reduced by considering not only the physical properties of the object O but also the estimated amount of entry of the pinching hand 122.

According to an embodiment, the control device 30 decides a degree to which the holder 100 presses a surface of the object O in the holding plan on the basis of the physical properties of the object O. According to an embodiment, the control device 30 decides a target position to which the holder 100 moves to grasp the object O in the holding plan, on the basis of the physical properties of the object O. According to such a configuration, an amount by which the holder 100 presses the object O and the target position can be set so that a success rate of the grasping motion increases in accordance with the physical properties (e.g., the ease of deformation) of the object O. Thereby, adaptability to various objects O can be improved.

According to an embodiment, the physical properties include properties related to at least one of flexibility and deformability. According to an embodiment, the control device 30 causes the holder 100 to deform the object O when the holder 100 grasps the holding region. With such a configuration, the handling system 1 can generate a holding plan including a process in which the holder 100 deforms the object O in consideration of the flexibility and deformability of the object O. Thereby, adaptability to various objects O can be improved.

In addition, in each embodiment, it is assumed that the process of the control device 30 is implemented with program software within an external storage device such as a memory using one or more processors such as a central processing unit (CPU), but may be implemented with hardware (e.g., a circuit part; circuitry) which does not use the CPU. Moreover, the process may be executed via a cloud server.

An instruction indicated in the processing procedure shown in each embodiment can be executed on the basis of a program which is software. A general-purpose computer system can obtain an effect similar to the effect of the processing procedure by reading the program stored in advance. The instructions described in each embodiment are recorded on a magnetic disc (a flexible disc, a hard disc, or the like), an optical disc (a CD-ROM, a CD-R, a CD-RW, a DVD-ROM, a DVD±R, a DVD±RW, a Blu-ray (registered trademark) disc, or the like), a semiconductor memory, or a recording medium similar thereto as a program which can be executed by a computer. If a computer or a built-in system is a readable recording medium, its storage form may be any form. The computer reads the program from the recording medium and executes instructions described in the program by the CPU on the basis of the program, thereby implementing an operation similar to the processing procedure. The computer may acquire or read the program through a network.

An operating system (OS) operating on the computer, database management software, middleware (MW) such as a network, or the like may execute a part of the processing procedure on the basis of the instructions of the program installed in the computer or a built-in system from the recording medium. A recording medium in each embodiment includes not only a medium independent of a computer and a built-in system but also a recording medium in which a program transmitted through a LAN, the Internet, or the like is downloaded and stored or temporarily stored. The recording medium may be not limited to one type and the process may be executed from a plurality of media. Such a recording medium may have any configuration.

A computer or a built-in system in each embodiment is used for executing each process in each embodiment on the basis of a program stored in a recording medium and may have any configuration of a single device such as a personal computer or a microcomputer, or a system to which a plurality of devices are connected via a network. A computer in each embodiment is not limited to a personal computer but is a generic term for equipment and devices capable of implementing functions in each embodiment using a program, including an arithmetic processing device, a microcomputer, and the like included in an information processing device.

According to at least one embodiment described above, the control device 30 decides the holding region and the holding plan in accordance with the physical properties of the object O, thereby improving the adaptability of the handling system 1 to various objects O.

Each of the functional portions such as the acquirer, the planner, the executor, and the storage described in the above-described example is a functional portion implemented by a hardware configuration including a processor, a memory, a storage, an input/output interface, a communication interface, a bus for interconnecting them, and the like provided in the control device in cooperation.

While several embodiments of the present invention have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

Appendix 1

A handling system including:

a holder configured to hold an object; and a controller configured to control the holder, wherein the controller is configured to:

acquire information about physical properties of the object, generate a holding plan for holding the object by the holder on the basis of the physical properties, wherein the holding plan includes information of a holding region of the object in which the object is held by the holder, and cause the holder to hold the object on the basis of the holding plan.

Appendix 2

The handling system according to appendix 1, wherein the controller is configured to decide the holding region in which the object is held by the holder, on the basis of the physical properties of the object.

Appendix 3

The handling system according to appendix 1 or 2, wherein the controller is configured to acquire image data of the object and perform image recognition for the image data on the basis of the physical properties of the object.

Appendix 4

The handling system according to appendix 3, wherein the controller is configured to, in the image recognition, perform a filtering process for the image data on the basis of the physical properties of the object.

Appendix 5

The handling system according to appendix 3 or 4, wherein the holder includes an adsorber configured to adsorb the object, and wherein the controller is configured to detect an adsorption region of the object, to which the adsorber can adsorb, on the basis of the physical properties of the object and identify the adsorption region as the holding region.

Appendix 6

The handling system according to any one of appendixes 1 to 5, wherein the controller is configured to identify a plurality of candidate regions for the object as candidates for the holding region in which the object is held by the holder, calculate a score for each of the candidate regions on the basis of the physical properties of the object, and decide the holding region in which the object is held by the holder, on the basis of the score.

Appendix 7

The handling system according to appendix 6, wherein the score includes a component related to a center-of-gravity position of the object, and wherein the controller is configured to calculate the component related to the center-of-gravity position on the basis of the physical properties of the object.

Appendix 8

The handling system according to appendix 6 or 7, wherein the holder includes a pincher having a pinching hand configured to pinch the object, and wherein the controller is configured to calculate the score on the basis of an estimated amount of entry of the pinching hand into the candidate region.

Appendix 9

The handling system according to any one of appendixes 1 to 8, wherein the controller is configured to decide a degree to which the holder presses a surface of the object in the holding plan on the basis of the physical properties of the object.

Appendix 10

The handling system according to any one of appendixes 1 to 9, wherein the controller is configured to decide a target position to which the holder moves to hold the object in the holding plan, on the basis of the physical properties of the object.

Appendix 11

The handling system according to any one of appendixes 1 to 10, wherein the physical properties include properties related to at least one of flexibility and deformability.

Appendix 12

The handling system according to appendix 11, wherein the controller is configured to cause the holder to deform the object when the holder holds the holding region.

Appendix 13

A handling method to be executed by a processor of a computer, the handling method including:

an information acquisition step;

a planning step; and an execution step, wherein the information acquisition step includes acquiring information about physical properties of an object, wherein the planning step includes generating a holding plan for holding the object by a holder configured to hold the object, on the basis of the physical properties, wherein the holding plan includes information of a holding region of the object in which the object is held by the holder, and wherein the execution step includes causing the holder to hold the object on the basis of the holding plan.

Appendix 14

A program for causing a processor of a computer to execute a handling method, the handling method including:

an information acquisition step;

a planning step; and an execution step, wherein the information acquisition step includes acquiring information about physical properties of an object, wherein the planning step includes generating a holding plan for holding the object by a holder configured to hold the object, on the basis of the physical properties, wherein the holding plan includes information of a holding region of the object in which the object is held by the holder, and wherein the execution step includes causing the holder to hold the object on the basis of the holding plan.

Appendix 15

An information processing device for generating a holding plan for holding an object by a holder, the information processing device including:

a processor configured to:

acquire information about physical properties of the object, and generate the holding plan for holding the object by the holder on the basis of the physical properties, wherein the holding plan includes information of a holding region of the object in which the object is held by the holder.

Appendix 16

A data structure for a handling system including a holder configured to hold an object and a controller configured to control the holder, the data structure including, with respect to a plurality of objects, identification information of each object and information about physical properties of each object, wherein the data structure is used for a process in which: the controller identifies an object to be held, the controller generates a holding plan for holding the object by the holder on the basis of the information about the physical properties corresponding to the object, wherein the holding plan includes information of a holding region of the object in which the object is held by the holder, and the controller causes the holder to hold the object on the basis of the holding plan.

Appendix 17

The data structure according to Appendix 16, wherein the data structure is updated on the basis of a result of causing the holder to hold the object.

Appendix 18

A handling method of handling an object using the data structure according to Appendix 16 or 17, the handling method including steps of:

in a case in which the object is not included in the data structure, identifying another object having similarity to the object among the plurality of objects included in the data structure;

generating a holding plan for holding the object by the holder configured to hold the object on the basis of the information about the physical properties of the identified object, wherein the holding plan includes the information of the holding region of the object in which the object is held by the holder, and causing the holder to hold the object on the basis of the holding plan.

Appendix 19

The handling method according to Appendix 18, further including a step of updating the data structure on the basis of a result of causing the holder to hold the object.

What is claimed is:

1. A handling system, comprising:

a holder configured to hold an object; and a controller configured to control the holder, wherein the controller is configured to:

acquire information about properties of at least one of flexibility and deformability of the object, generate a holding plan for holding the object by the holder based on the acquired information, wherein the holding plan includes information of a holding region of the object in which the object is held by the holder, cause the holder to hold the object on the basis of the holding plan, identify a plurality of candidate regions for the object as candidates for the holding region in which the holder holds the object, calculate a score for each of the candidate regions based on the information, and decide the holding region in which the holder holds the object, based on the calculated score, in a case in which the object has neither of flexibility nor deformability of a certain level or higher calculate the score using a first evaluation equation including a score component related to a center-of-gravity position of the object, and in a case in which the object has at least one of flexibility and deformability of the certain level or higher, calculate the score using a second evaluation equation, different from the first evaluation equation, in which a weight of the score component related to the center-of-gravity position of the object is set to be smaller than the corresponding weight in the first evaluation equation or is set to be zero.

2. The handling system according to claim 1, wherein the controller is further configured to decide the holding region in which the holder holds the object, based on the information.

3. The handling system according to claim 1, wherein the controller is further configured to acquire image data of the object and perform image recognition for the image data based on the information.

4. The handling system according to claim 3, wherein the controller is further configured to, in the image recognition, perform a filtering process for the image data based on the information.

5. The handling system according to claim 3, wherein the holder includes an adsorber configured to adsorb the object, and wherein the controller is further configured to detect an adsorption region of the object, to which the adsorber can adsorb, based on the information, and identify the adsorption region as the holding region.

6. The handling system according to claim 1, wherein the holder includes a pincher having a pinching hand configured to pinch the object, and wherein the controller is further configured to calculate the score based on an estimated amount of entry of the pinching hand into the candidate region.

7. The handling system according to claim 1, wherein the controller is further configured to decide a degree to which the holder presses a surface of the object in the holding plan based on the information.

8. The handling system according to claim 1, wherein the controller is further configured to decide a target position to which the holder moves to hold the object in the holding plan, based on the information.

9. The handling system according to claim 1, wherein the controller is further configured to cause the holder to deform the object when the holder holds the holding region.

10. A handling method to be executed by a processor of a computer, the handling method comprising:

an information acquisition step;

a planning step; and an execution step, wherein the information acquisition step includes acquiring information about properties of at least one of flexibility and deformability of an object, wherein the planning step includes:

generating a holding plan for holding the object by a holder configured to hold the object, based the acquired information, wherein the holding plan includes information of a holding region of the object in which the object is held by the holder, identifying a plurality of candidate regions for the object as candidates for the holding region in which the holder holds the object, calculating a score for each of the candidate regions based on the information, and deciding the holding region in which the holder holds the object, based on the calculated score, in a case in which the object has neither of flexibility nor deformability of a certain level or higher, calculating the score using a first evaluation equation including a score component related to a center-of-gravity position of the object, and in a case in which the object has at least one of flexibility and deformability of the certain level or higher, calculating the score using a second evaluation equation, different from the first evaluation equation, in which a weight of the score component related to the center-of-gravity position of the object is set to be smaller than the corresponding weight in the first evaluation equation or is set to be zero, and wherein the execution step includes causing the holder to hold the object based on the holding plan.

11. A non-volatile computer-readable storage medium storing a program for causing a processor of a computer to execute a handling method, the handling method comprising:

an information acquisition step;

a planning step; and an execution step, wherein the information acquisition step includes acquiring information about properties of at least one of flexibility and deformability of an object, wherein the planning step includes:

generating a holding plan for holding the object by a holder configured to hold the object, based on the acquired information, wherein the holding plan includes information of a holding region of the object in which the object is held by the holder, identifying a plurality of candidate regions for the object as candidates for the holding region in which the holder holds the object, calculating a score for each of the candidate regions based on the information, and deciding the holding region in which the holder holds the object, based on the calculated score, in a case in which the object has neither of flexibility nor deformability of a certain level or higher, calculating the score using a first evaluation equation including a score component related to a center-of-gravity position of the object, and in a case in which the object has at least one of flexibility and deformability of the certain level or higher, calculating the score using a second evaluation equation, different from the first evaluation equation, in which a weight of the score component related to the center-of-gravity position of the object is set to be smaller than the corresponding weight in the first evaluation equation or is set to be zero, and wherein the execution step includes causing the holder to hold the object based on the holding plan.

12. An information processing device for generating a holding plan for holding an object by a holder, the information processing device comprising:

a processor configured to:

acquire information about properties of at least one of flexibility and deformability of the object, generate the holding plan for holding the object by the holder based on the acquired information, wherein the holding plan includes information of a holding region of the object in which the object is held by the holder, identify a plurality of candidate regions for the object as candidates for the holding region in which the holder holds the object, calculate a score for each of the candidate regions based on the information, and decide the holding region in which the holder holds the object, based on the calculated score, in a case in which the object has neither of flexibility nor deformability of a certain level or higher, calculate the score using a first evaluation equation including a score component related to a center-of-gravity position of the object, and in a case in which the object has at least one of flexibility and deformability of the certain level or higher, calculate the score using a second evaluation equation, different from the first evaluation equation, in which a weight of the score component related to the center-of-gravity position of the object is set to be smaller than the corresponding weight in the first evaluation equation or is set to be zero.

13. The handling system according to claim 1, wherein the controller is further configured to, in a case in which the object has at least one of flexibility and deformability of the certain level or higher, permit the holding at a position farther from the center-of-gravity position of the object than a case in which the object has neither of flexibility nor deformability of the certain level or higher.

14. The handling system according to claim 1, wherein the controller is further configured to determine whether or not the object has at least one of flexibility and deformability of the certain level or higher.

15. The handling system according to claim 6, wherein the controller is further configured to calculate the score using the second evaluation equation only in a case in which the estimated amount of entry exceeds a predetermined threshold value.

16. The handling system according to claim 7, wherein the holder includes an adsorber configured to adsorb the object, and wherein the controller is further configured to:

in a case in which the object has neither of flexibility nor deformability of the certain level or higher, set an amount by which the adsorber presses the object to a first pressing amount being equal to or more than zero, and in a case in which the object has at least one of flexibility and deformability of the certain level or higher, set an amount by which the adsorber presses the object to a second pressing amount larger than the first pressing amount.

17. The handling system according to claim 8, wherein the controller is further configured to, in a case in which the object has at least one of flexibility and deformability of the certain level or higher, set the target position to be a position inside the object.

18. The handling system according to claim 1, wherein the object is a bag-like article or an article packaged with an outer package.

* * * * *